(12) United States Patent
Sakao et al.

(10) Patent No.: US 7,188,068 B1
(45) Date of Patent: Mar. 6, 2007

(54) METHOD AND APPARATUS FOR DATA RECEPTION

(75) Inventors: Katsutoshi Sakao, Kanagawa (JP); Tadaharu Koga, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/445,085

(22) PCT Filed: Apr. 2, 1999

(86) PCT No.: PCT/JP99/01757

§ 371 (c)(1),
(2), (4) Date: Dec. 2, 1999

(87) PCT Pub. No.: WO99/52111

PCT Pub. Date: Oct. 14, 1999

(30) Foreign Application Priority Data

| Apr. 3, 1998 | (JP) | ................ P10-091254 |
| Apr. 3, 1998 | (JP) | ................ P10-091255 |
| Apr. 3, 1998 | (JP) | ................ P10-091256 |
| Apr. 3, 1998 | (JP) | ................ P10-091257 |
| Apr. 3, 1998 | (JP) | ................ P10-091258 |

(51) Int. Cl.
*G10L 19/00* (2006.01)
(52) U.S. Cl. .................... 704/500; 725/133
(58) Field of Classification Search ........ 704/500–504, 704/270; 700/94
See application file for complete search history.

(56) References Cited

U.S. PATENT DOCUMENTS

| 5,541,638 | A | * | 7/1996 | Story .................... 725/116 |
| 5,572,442 | A | * | 11/1996 | Schulhof et al. ........... 455/3.04 |
| 5,654,747 | A | * | 8/1997 | Ottesen et al. .............. 725/1 |
| 5,790,423 | A | * | 8/1998 | Lau et al. .................. 700/94 |
| 5,838,996 | A | * | 11/1998 | deCarmo .................. 710/68 |
| 5,841,979 | A | * | 11/1998 | Schulhof et al. ........... 700/94 |
| 5,926,624 | A | * | 7/1999 | Katz et al. ................ 709/217 |
| 6,199,076 | B1 | * | 3/2001 | Logan et al. .............. 434/319 |
| 6,516,299 | B1 | * | 2/2003 | Case ........................ 704/500 |
| 2002/0042918 | A1 | * | 4/2002 | Townsend et al. .......... 725/41 |

FOREIGN PATENT DOCUMENTS

| JP | 7-147063 | 6/1995 |
| JP | 7-254222 | 10/1995 |
| JP | 9-265731 | 10/1997 |

* cited by examiner

*Primary Examiner*—Angela Armstrong
(74) *Attorney, Agent, or Firm*—Lerner, David, Littenberg, Krumholz & Mentlik, LLP

(57) ABSTRACT

An integrated receiver decoder (IRD) includes a receiver and an MPEG audio decoder for receiving and decoding a compressed digital broadcast signal. A first output terminal connects to a bi-directional data communication line according to a first digital interface standard to provide the received digital signal to an external device. A second output terminal connects to a one-way data communication line according to a different digital interface standard to provide audio data decoded from the received digital signal to the external device. A controller controls the IRD to output the digital signal or the decoded digital audio data according to the connection state of the external device.

20 Claims, 21 Drawing Sheets

METHOD AND APPARATUS FOR DATA RECEPTION

TECHNICAL FIELD

This invention relates to a data receiving device and a data receiving method suitably used in a system for providing music broadcast by digital satellite broadcast, and particularly to a data receiving device and a data receiving method for transmitting data corresponding to the type of a data storage device connected to the data receiving device to the data storage device.

BACKGROUND ART

Recently, digital broadcast for transmitting image data and music data as digital data has come into notice and is becoming popularly used. An advantage of the digital satellite broadcast is that a signal of high quality durable to noise and fading in comparison with a signal of the existing analog broadcast can be transmitted on the same transmission line. Also, the frequency use efficiency is improved, thus realizing multi-channel transmission. For example, in the digital satellite broadcast, hundreds of channels can be secured by one satellite. In such digital satellite broadcast, a number of dedicated channels for sports, movies, music, news and the like are prepared, and programs of dedicated contents are broadcast in these dedicated channels.

Among these dedicated channels, the music channel is one of the popular channels. In the music channel, a promotion program for introducing new songs and hit songs is broadcast.

As described above, in the conventional music channel, the program for introducing new songs and hit songs is transmitted by dynamic images and sounds. When a viewer watches such a program of the music channel and finds a favorite tune, the viewer may wish to buy and enjoy a CD of the introduced tune. Also, the viewer may wish to know information about the artist of the tune and information about an album including that tune. Therefore, if possible, it is very convenient that the viewer can immediately obtain the information about the artist of the tune and the information about the album including that tune when watching the music program, or that the viewer can down-load audio data of the favorite tune when it is found.

However, with the conventional music channel, dynamic images and sounds of the tune are sent in a one-sided manner and the above-described demands cannot be met.

Thus, to solve such a problem, there is disclosed a music contents distribution system which makes it possible to easily obtain information about the music being broadcast in the music channel and to easily down-load the tune data to a data storage device, in the specification and drawings of the PCT application PCT/JP98/0544 (filed on Nov. 10, 1998).

DISCLOSURE OF THE INVENTION

In view of the foregoing state of the art, it is an object of the present invention to provide a data receiving device and a data receiving method which enable selection of the type of received data in accordance with the type of a data storage device in the music contents distribution system as described above.

A data receiving device according to the present invention is adapted for receiving compressed digital data distributed through a transmission line. The data receiving device includes: processing means for processing received compressed digital data, thereby enabling output of a plurality of output signals of different types; a plurality of output means corresponding to the plurality of output signals processed by the processing means; and control means for carrying out control so that an output signal is outputted from one of the plurality of output means in accordance with the connection state between each output means and an external storage device.

A data receiving method according to the present invention is adapted for receiving compressed digital data distributed through a transmission line by a data receiving device and outputting the compressed digital data to an external storage device. The data receiving method includes the steps of: processing received compressed digital data so that a plurality of output signals of different types can be outputted to the storage device; and selecting one of the plurality of output signals in accordance with the connection state between the storage device and the data receiving device and outputting the selected output signal to the storage device.

Also, a data receiving device according to the present invention is adapted for receiving compressed digital data and additional information distributed through a transmission line. The data receiving device includes: receiving means for receiving compressed digital data and additional information; and output means for outputting the received compressed digital data and additional information to a storage device.

Also, a data receiving method according to the present invention is adapted for receiving compressed digital data and additional information distributed through a transmission line by a data receiving device and outputting the compressed digital data and additional information to an external storage device. The data receiving method includes the steps of: receiving compressed digital data and additional information; and outputting the received compressed digital data and additional information to the storage device.

Also, a data receiving device according to the present invention is adapted for storing down-load record information into a storage unit every time desired contents are selected and down-loaded from a plurality of contents distributed through a transmission line, and transmitting the information stored in the storage unit to a predetermined record information transmission destination at predetermined timing, thus carrying out charging processing. The data receiving device includes a second storage unit for storing information about the contents of selection or down-loading; and means for transmitting the information stored in the second storage unit to a transmission destination different from the record information transmission destination at predetermined timing.

Also, a data receiving device according to the present invention is adapted for receiving compressed digital data distributed through a transmission line. The data receiving device includes: first data expansion means for expanding compressed digital data; second data expansion means for expanding compressed digital data; and control means for carrying out control so as to use one of the output of the first data expansion means and the output of the second data expansion means for monitoring and to use the other for data storage.

Moreover, a data receiving device according to the present invention includes: receiving means for receiving compressed digital audio data repeatedly distributed through a transmission line; storage means for storing the compressed digital audio data received by the receiving means;

and control means for controlling reading from a predetermined part of the compressed digital audio data stored in the storage means.

In the data receiving device and the data receiving method according to the present invention, received compressed digital data is processed to enable output of a plurality of output signals of different types, and control is carried out so that an output signal is outputted from one of a plurality of output means in accordance with the connection state between the plurality of output means and an external storage device.

Also, in the data receiving device and the data receiving method according to the present invention, received compressed digital data and additional information are outputted to a storage device.

Also, in the data receiving device according to the present invention, when desired contents are selected or down-loaded from a plurality of contents, information about the selected or down-loaded contents is stored, and the stored information is transmitted to a transmission destination different from a record information transmission destination for charging processing at predetermined timing.

Also, in the data receiving device according to the present invention, a plurality of data expansion means for expanding distributed compressed digital data are provided so that one of the data expansion means is used for monitoring while the other is used for data storage.

Moreover, in the data receiving device according to the present invention, repeatedly distributed compressed digital audio data is received, and the received compressed digital audio data is stored. Then, control is carried out so as to carry out reading from a predetermined part of the stored compressed digital audio data.

BEST MODE FOR CARRYING OUT THE INVENTION

Preferred embodiments of the data receiving device and the data receiving method according to the present invention will now be described in detail with reference to the drawings.

In a system to which the present invention is applied, a music program is broadcast by using digital satellite broadcast while audio data associated with the music program is distributed, a viewer/listener can listen to the music program on trial. In addition, if the viewer/listener finds a favorite tune as a result of trial listening, the viewer/listener can easily purchase the tune on the spot.

Figure 1:
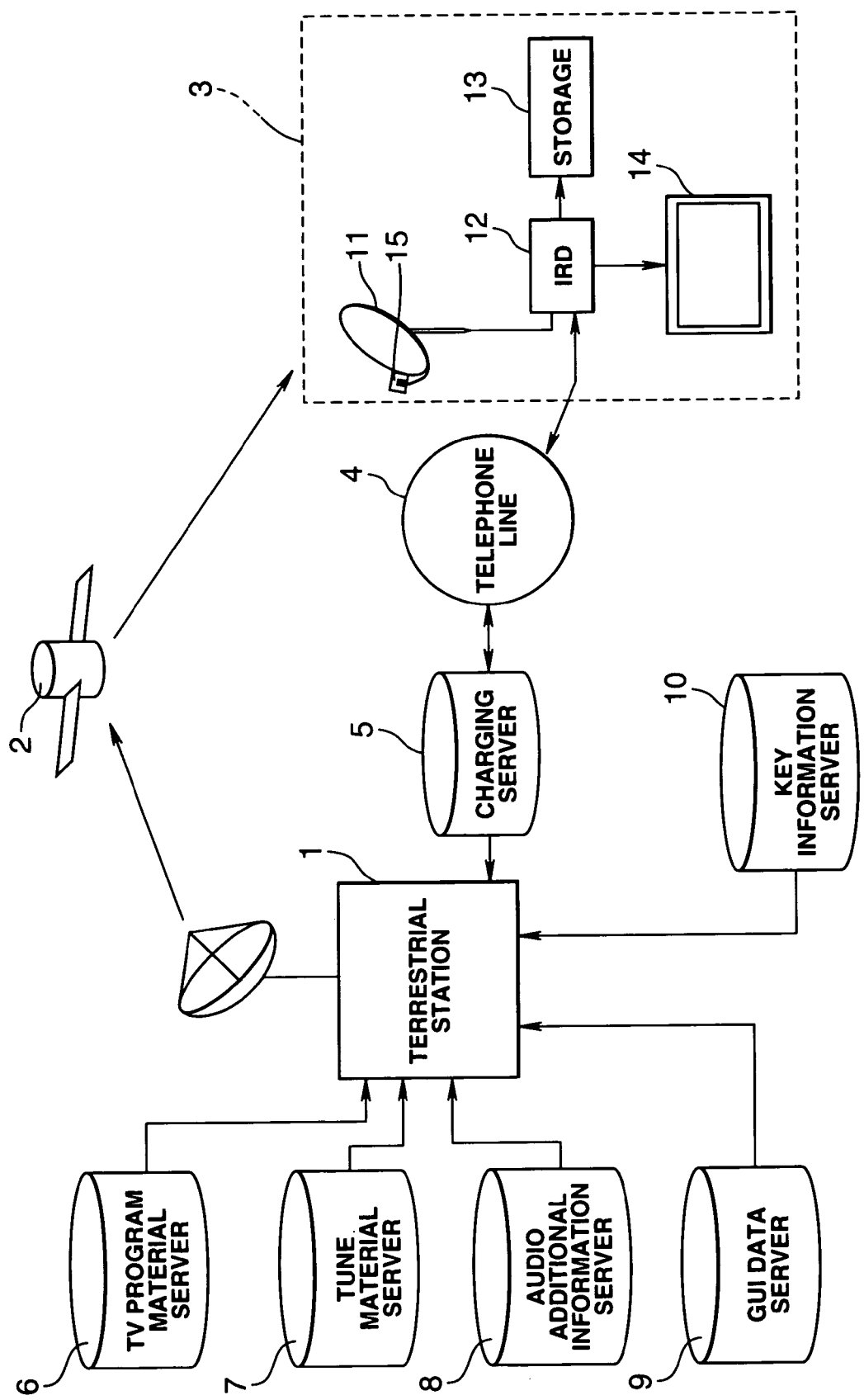
FIG. 1 is a block diagram showing the overall structure of an exemplary music contents distribution system to which the present invention is applied.

FIG. 1 shows the overall structure of a music contents distribution system to which the present invention is applied. As shown in FIG. 1, a material of television program broadcast from a television program material server 6, a material of tune data from a tune material server 7, audio additional information from an audio additional information server 8, GUI data from a GUI (graphical user interface) data server 9 are sent to a terrestrial station 1 of digital satellite broadcast.

The television program material server 6 is a server providing a material of a normal music broadcast program. The material of the music broadcast program sent from the television program material server 6 includes images and sounds of the television program. The normal music broadcast program is, for example, a promotion program for introducing new songs or a ranking program with respect to the latest hit songs.

The tune material server 7 is a server providing audio data associated with the music broadcast program. That is, audio data of tunes of the artists introduced in the music broadcast program or audio data of the top ten tunes in the ranking program are provided. This tune material server 7 stores audio data of a plurality of tunes and sends these audio data to the terrestrial station 1. The audio data of each tune is repeatedly broadcast within a predetermined unit time, as will be later described.

The audio additional information server 8 provides additional information of the tunes provided from the tune material server 7, for example, lyrics information, concert information of an artist and the like.

The GUI data server 9 provides data for forming a screen of a list page of distributed tunes or an information page of each tune, data for forming still picture data of an album jacket, and data for forming an EPG (electric program guide) screen. In the system to which the present invention is applied, as will be later described in detail, the lyrics of distributed tunes, the concert information and profile of an artist and the like can be displayed on the screen by operating the GUI on the screen. Also, selection and downloading of a tune, reservation thereof and the like can be carried out by operating the GUI on the screen. The GUI data is described in MHEG (Multimedia and Hypermedia Information Coding Experts Group), which is a multimedia language.

The terrestrial station 1 multiplexes the video data and audio data as the music program broadcast material from the television program material server 6, the audio data from the tune material server 7, the additional information from the audio additional information server 8 and the GUI data from the GUI data server 9, and transmits the multiplexed data. In this case, the video data of the television program broadcast is compressed by the MPEG (Moving Picture Experts Group) 2 system, and the audio data of the television program broadcast is compressed by the MPEG audio system. The audio data from the tune material server 7 is compressed by two different systems, for example, the MPEG audio system and the ATRAC (adaptive transform acoustic coding) system. Also, in multiplexing these data, the data are enciphered by using key information from a key information server 10.

Signal from the terrestrial station 1 are received by receiver facilities 3 of each home through a satellite 2. A plurality of transponders are mounted on the satellite 2. One transponder has transmission capability of, for example, 30 Mbps. As the receiver facilities 3 of each home, a parabolic antenna 11, an IRD (integrated receiver decoder) 12, a storage device 13 and a television receiver 14 are prepared.

Signals sent through the satellite 2 are received by the parabolic antenna 11. The received signals are converted to a predetermined frequency by a LNB (low noise block down-converter) 15 mounted on the parabolic antenna 11 and are then supplied to the IRD 12.

The IRD 12 selects a signal of a predetermined channel from the received signals, and demodulates and decodes the video data and audio data. The IRD 12 also has a MHEG decode engine function so as to process MHEG data multiplexed onto broadcast signals, thus forming a tune list page, an information page of each tune and a EPG screen. Then, the output of the IRD 12 is supplied to the television receiver 14.

The storage device 13 is adapted for saving down-loaded audio data. For example, a mini disc (MD, trade name of Sony Corporation) recorder/player, a digital audio tape recorder/player, a digital video disc (DVD) recorder/player or the like can be used as the storage device 13. It is also possible to use a personal computer as the storage device 13 and save the audio data onto its hard disk or a CD-R.

The IRD 12 has a modem 63 (FIG. 6) provided therein and is connected to a telephone line 4 through the modem 63. The IRD 12 is connected to a charging server 5 through the telephone line 4. The IRD 12 has an IC card slot 62 (FIG. 6) in which an IC card 65 (FIG. 6) having various information stored thereon is inserted. When audio data of a tune is down-loaded, the information is stored on the IC card 65. The down-load record information stored on the IC card 65 is sent to the charging server 5 through the telephone line 4 at predetermined timing. In accordance with the down-load information, the charging server 5 appropriately charges the viewer for the down-loading. By thus carrying out appropriate charging, the copyright of the down-loaded tune can be protected.

As described above, in the system to which the present invention is applied, the terrestrial station 1 multiplexes the video data and audio data as the music program broadcast material from the television program material server 6, the audio data from the tune material server 7, the additional information data from the audio additional information server 8 and the GUI data from the GUI data server 9, and transmits the multiplexed data. Then, when this broadcast is received by the receiver facilities 3 of each home, the viewer can watch the music program and the GUI screen is displayed on the basis of the transmitted GUI data. By carrying out necessary operation while watching the GUI screen, the viewer can see the information page about each tune and can listen to each tune on trial. Moreover, by carrying out necessary operation while watching the GUI screen, the viewer can down-load audio data of a desired tune and store the audio data into the storage device 13.

The operation carried out by the viewer using the receiver facilities 3 will now be described further in detail.

Figure 2:
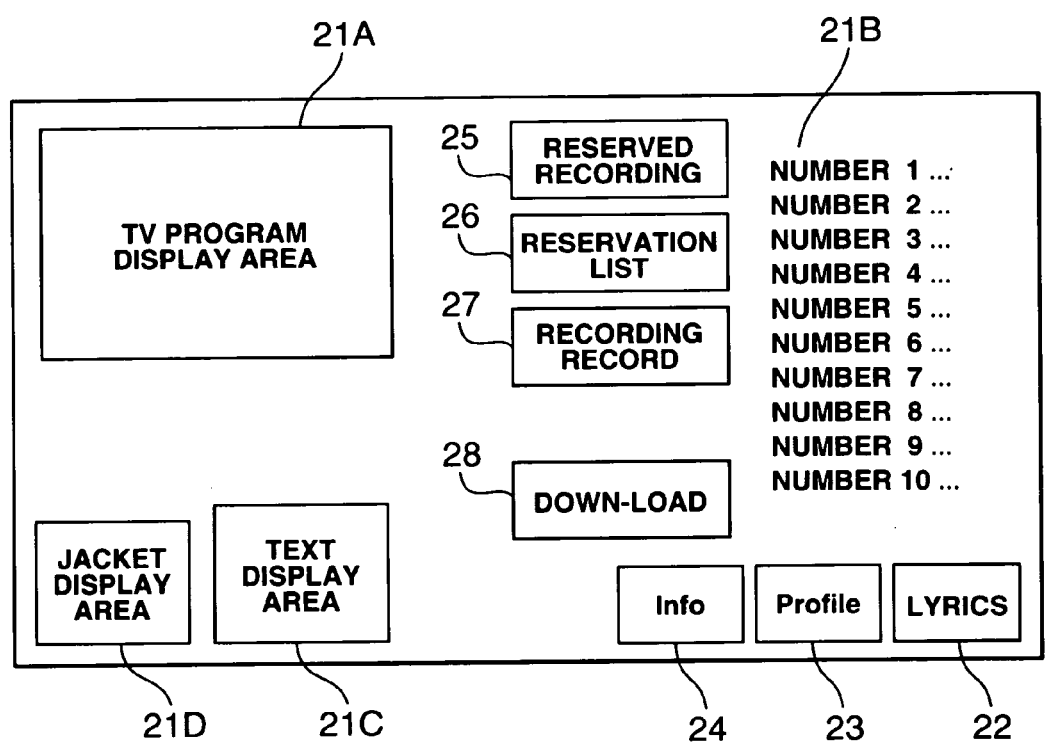
FIG. 2 shows an exemplary screen displayed on a television receiver in the system shown in FIG. 1.

When the music broadcast program is received by the receiver facilities 3 of each home, the image of the music broadcast program is displayed on the entire screen of the television receiver 14. By carrying out predetermined operation using a remote commander 64 (FIG. 6), for example, by pressing a button (not shown) of "interactive program" provided on the remote controller 64, the image of the music broadcast program is reduced and various information is displayed in the other parts of the screen, as shown in FIG. 2. In a television program display area 21A at an upper left part of the screen, the image based on the music program provided from the television program material server 6 is displayed. At an upper right part of the screen, a tune list 21B of transmitted audio data is displayed. At a lower left part of the screen, a text display area 21C and a jacket display area 21D are set. In addition, on the right side of the screen, a lyrics display button 22, a profile display button 23, an information display button 24, a reserved recording button 25, a reservation list display button 26, a recording record display button 27 and a down-load button 28 are displayed. This display form of the screen is one example, in which the MHEG data transmitted from the GUI data server 9 is processed for display by the MHEG decode engine in the IRD 12. By changing the MHEG data transmitted from the GUI data server 9, various screens can be displayed.

The viewer searches for a tune of interest while watching the tune names displayed in the list 21B. On finding the tune of interest, the viewer operates an arrow key of the remote commander 64 to adjust the cursor to the tune and then presses an enter key of the remote commander 64. Thus, the viewer can listen on trial to the tune to which the cursor is adjusted. Since the audio data of the same plural tunes are repeatedly broadcast during a predetermined unit time (broadcasting time of the associated music broadcast program), the audio data of the designated tune is extracted from the broadcast signals while the screen of the television program display area 21A remains as it is (though the sound is not outputted). The extracted audio data is decoded, thus enabling the viewer to listen to the tune. At this point, a still picture of the jacket of the tune is displayed in the jacket display area 21D.

When the cursor is adjusted to the lyrics display button 22 in this state and then the enter key of the remote commander 64 is pressed, the lyrics of the tune are displayed in the text display area 21C at the timing synchronized with the audio data. (Hereinafter, the operation of adjusting the cursor to the button and pressing the enter key is referred to as "press the button".) Similarly, when the profile display button 23 or the information display button 24 is pressed, the profile or the concert information or the like of the artist corresponding to the tune is displayed in the text display area 21C. Thus, the viewer can learn what tune is currently being distributed and detailed information about each tune.

For purchasing the tune which the viewer listened to on trial, the viewer presses the down-load button 28. When the down-load button 28 is pressed, the audio data of the selected tune is down-loaded and stored into the storage device 13. The lyrics data, the profile information of the artist, the still image data of the jacket and the like can also be down-loaded together with the audio data of the tune. Every time a tune is down-loaded, the information thereof is stored onto the IC card 65 (FIG. 6) in the IRD 12. The information stored on the IC card 65 is transmitted to the charging server 5 through the modem 63 (FIG. 6), for example, one a month. Thus, the copyright of the down-loaded tune can be protected.

For making reservation for down-loading, the viewer presses the reserved recording button 25. When this button is pressed, the GUI screen is switched to display a list of tunes that can be reserved on the entire screen. In this list, tunes retrieved on the hourly basis, on the weekly basis or by genre can be displayed. When the viewer selects a tune to be reserved for down-loading from the list, the information thereof is registered in the IRD 12. If the viewer wishes to confirm the tune reserved for down-loading, the reserved tune can be displayed on the entire screen by pressing the reservation list display button 26. The tune, thus reserved, is down-loaded by the IRD 12 at a reserved time and stored into the storage device 13.

If the viewer wishes to confirm the down-loaded tune, a list of down-loaded tunes can be displayed on the entire screen by pressing the recording record button 27.

In this manner, in the receiver facilities 3 of the system to which the present invention is applied, the list of tunes is displayed on the GUI screen of the television receiver 14. Then, by selecting a tune in accordance with the display on the GUI screen, the viewer can listen to the tune on trial and also can learn the lyrics of the tune, the profile of the artist and the like. Moreover, the viewer can carry out down-loading of the tune, reservation of the tune for down-loading, and display of the down-load record and the list of reserved tunes.

As described above, in the music contents distribution system to which the present invention is applied, the music broadcast program is distributed and the audio data of a plurality of tunes are distributed. A desired tune can be searched for by using the list of distributed tunes or the like, and the audio data of the tune can be easily saved in the storage device 13. Such a system will now be described further in detail.

Figure 3:
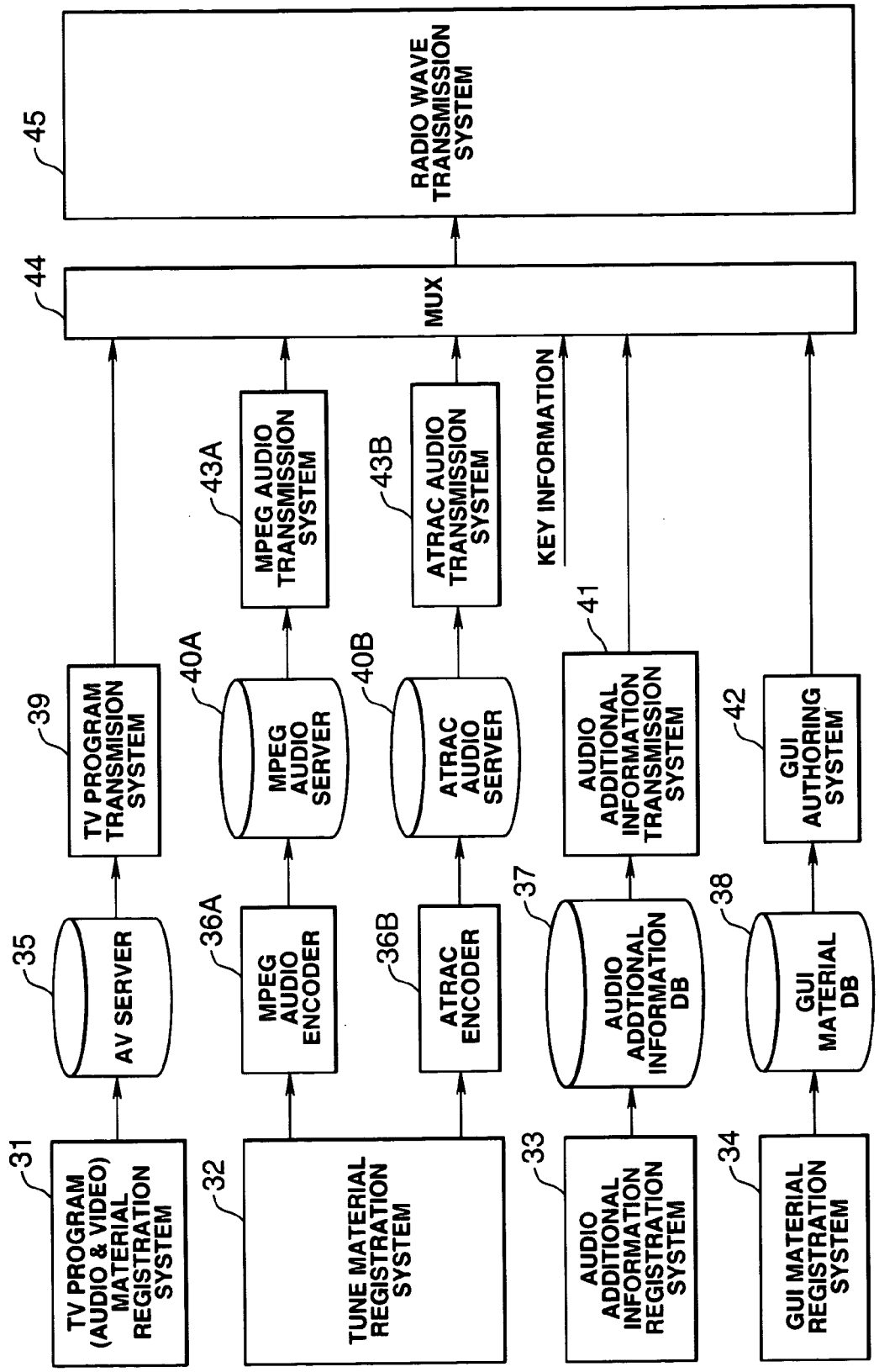
FIG. 3 is a block diagram showing an exemplary structure on the transmission side in the system shown in FIG. 1.

FIG. 3 shows the structure of the terrestrial station 1 in the music contents distribution system to which the present invention is applied.

In FIG. 3, video and audio material data from a television program material registration system 31 (equivalent to the television program material server 6 of FIG. 1) is registered to an AV server 35. The material data includes video data and audio data. The data registered to the AV server 35 is sent to a television program transmission system 39. The video data is compressed, for example, by the MPEG2 system, and the audio data is compressed and packetized, for example, by the MPEG audio system. The output of the television program transmission system 39 is sent to the multiplexer 44.

Audio data of a tune material registration system 32 (equivalent to the tune material server 7 of FIG. 1) is supplied to an MPEG audio encoder 36A and an ATRAC encoder 36B. The audio data is encoded by the respective encoders and then registered to an MPEG audio server 40A and an ATRAC audio server 40B. The MPEG audio data registered to the MPEG audio server 40A is sent to an MPEG audio transmission system 43A, where the audio data is packetized and then sent to a multiplexer 44. The ATRAC data registered to the ATRAC audio server 40B is sent to an ATRAC audio transmission system 43B, where the ATRAC data is packetized and processed for quadruple-speed transmission and then sent to the multiplexer 44. That is, the ATRAC audio data can be down-loaded at a quadruple speed.

Additional information from an audio additional information registration system 33 (equivalent to the audio additional information server 8 of FIG. 1) is registered to an audio additional information database 37. The additional information registered to the audio additional information database 37 is sent to an audio additional information transmission system 41, where the additional information is packetized and then sent to the multiplexer 44.

GUI data from a GUI material registration system 34 (equivalent to the GUI data server 9 of FIG. 1) is registered to a GUI material database 38. The GUI material data registered to the GUI material database 38 is sent to a GUI authoring system 42, where GUI screen data is processed and packetized and then sent to the multiplexer 44. The GUI material data includes still picture information of the jacket, concert information of the artist, a GUI production program and the like. The still picture information has 640×480 pixels compressed by the JPEG (Joint Photographic Experts Group) system, and the text information is text data of not more than 800 characters. The information is packetized.

In the multiplexer 44, the video packet and audio packet from the television program transmission system 39, the audio packet from the MPEG audio transmission system 43A, the quadruple-speed audio packet from the ATRAC audio transmission system 43B, the audio additional information packet from the audio additional information transmission system 41 and the GUI data packet from the GUI authoring system 42 are multiplexed on the time base and are enciphered by using key information from the key information server 10 (FIG. 1).

The output of the multiplexer 44 is sent to a radio wave transmission system 45, where processing such as addition of an error correction code, modulation and frequency conversion is carried out. After that, the output is transmitted from the antenna to the satellite 2.

Figure 4:
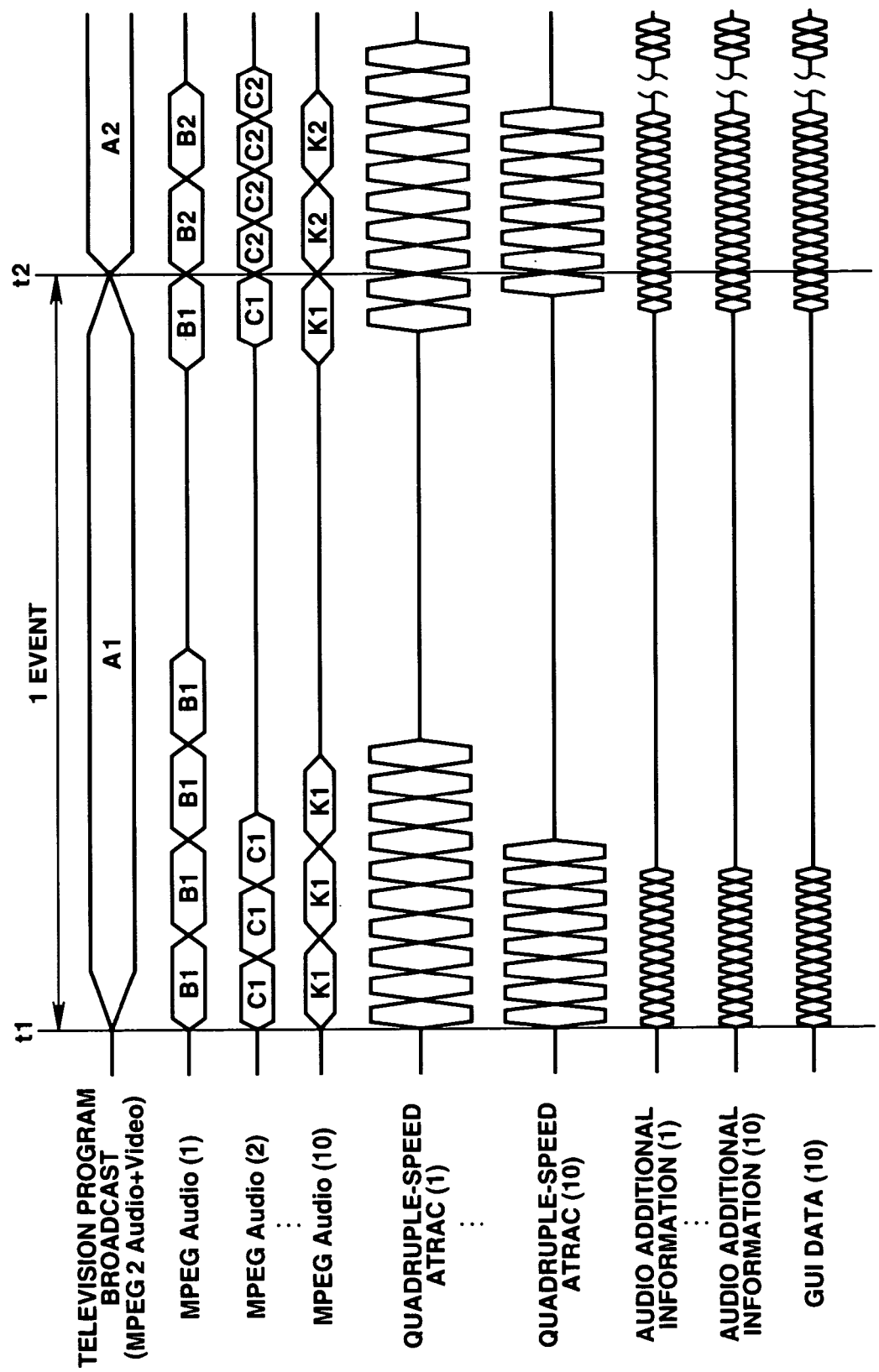
FIG. 4 shows an exemplary configuration of data transmitted in the system shown in FIG. 1.

FIG. 4 shows an example of data transmitted from the terrestrial station 1. Practically, the data shown in FIG. 4 are multiplexed on the time base. As shown in FIG. 4, data from a time point t1 to a time point t2 is one event, and the next event starts at the time point t2. An event is a unit (for example, one music broadcast program) for changing the lineup of tunes and normally consists of 30 minutes or one hour. For example, it may be considered to broadcast the 20th to 11th places of top 20 of the latest hit songs in the former event, and the 10th to first places in the latter event.

As shown in FIG. 4, a music program having predetermined contents A1 is broadcast in the event from the time point t1 to the time point t2. In the event starting at the time point t2, a music program having predetermined contents A2 is broadcast. These music programs are broadcast with images similar to those of ordinary television programs and sounds corresponding to the images.

On the other hand, the audio data is prepared for 10 tunes. The audio data of 10 tunes are repeatedly transmitted. That is, in the event from the time point t1 to the time point t2, a tune B1 is repeatedly transmitted as a tune 1, and a tune C1 is repeatedly transmitted as a tune 2. Similarly, a tune K1 is repeatedly transmitted as a tune 10. In the event starting at the time point t2, a tune B2 is repeatedly transmitted as a tune 1, and a tune C2 is repeatedly transmitted as a tune 2. Similarly, a tune K2 is repeatedly transmitted as a tune 10. This transmission of audio data is commonly carried out with respect to both the MPEG-compressed audio data and the ATRAC-compressed audio data.

In short, in FIG. 4, the MPEG audio data and the quadruple-speed ATRAC audio data having the same numeral in parentheses are related with the same tune. The numeral in parentheses of the audio additional information is additional information added to the tune of the same numeral. Also, still picture data and data of various buttons transmitted as the GUI data, and data for displaying the GUI are repeatedly transmitted. These data are multiplexed on the time base in transport packets of MPEG2 and are then transmitted. In the IRD 12, these data are reconstructed by using header information of each data packet.

Figure 5A:
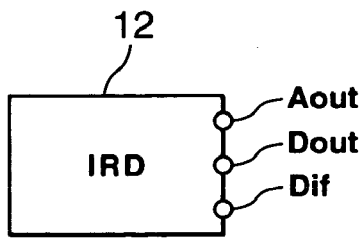
FIGS. 5A to 5D are explanatory views showing the relation of connection between an IRD and a storage device in the system shown in FIG. 1.

The receiver facilities 3 of each home will now be described. As shown in FIG. 1, the parabolic antenna 11, the IRD 12, the storage device 13 and the television receiver 14 are prepared as the receiver facilities of each home. The IRD 12 has an analog audio output terminal Aout, a digital audio output terminal Dout for sending audio data through an optical cable conformable to the IEC958 standard, and a digital interface terminal Dif conformable to the IEEE1394 standard, as shown in FIG. 5A. Therefore, as the storage device 13, a storage device having only an analog audio input terminal Ain, a storage device having a digital audio input terminal Din conformable to the IEC958 standard, or a storage device having a digital interface terminal Dif conformable to the IEEE1394 standard can be connected. In this case, it is assumed that a storage device for recording ATRAC-compressed audio data onto a recording medium, for example, a so-called mini disc (MD, trade name of Sony Corporation) recorder/player, is used as the storage device.

Figure 5B:
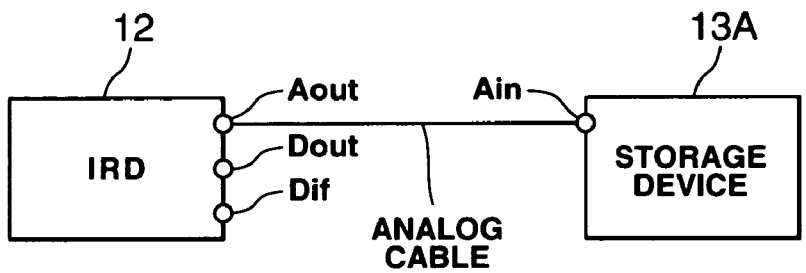
Figure 5C:
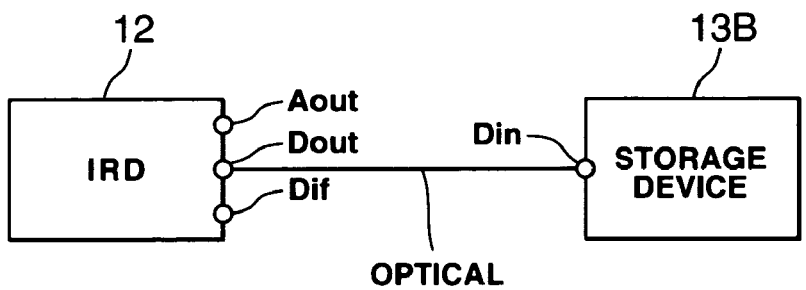

In the case where a storage device 13A having only an analog audio input terminal Ain is used as the storage device as shown in FIG. 5B, the analog audio output terminal Aout of the IRD 12 and the analog audio input terminal Ain of the storage device 13A are connected with each other by an analog cable. In the case where a storage device 13B having a digital audio input terminal Din conformable to the IEC958 standard is used as the storage device as shown in FIG. 5C, the digital audio output terminal Dout of the IRD 12 and the digital audio input terminal Din of the storage device 13B are connected with each other by an optical cable. In the case where a storage device 13C having a digital interface terminal Dif conformable to the IEEE1394 standard is used as the storage device as shown in FIG. 5D, the digital interface Dif of the IRD 12 and the digital interface Dif of the storage device 13 are connected with each other by a digital interface cable.

In the case where the storage device 13A having only an analog audio input terminal is used as shown in FIG. 5B, audio data that can be down-loaded is data compressed by the MPEG audio system. The MPEG audio data of a tune designated for down-loading is processed by MPEG audio decoding in the IRD 12, then D/A-converted, and outputted from the analog audio output terminal Aout. Then, the analog output is sent from the IRD 12 to the storage device 13A through the analog cable. In this case, it is also possible to transmit a control signal between the IRD 12 and the storage device 13A through radio communication using infrared rays or through wired communication using a cable, and confirm the connecting relation and the down-load operation.

In the case where the storage device 13B having a digital audio input terminal Din conformable to the IEC958 standard is used as the storage device as shown in FIG. 5C, audio data that can be down-loaded is data compressed by the MPEG audio system. The MPEG audio data of a tune designated for down-loading is processed by MPEG audio decoding in the IRD 12, and a digital audio signal is transmitted to the storage device 13B through the optical cable. In this case, too, it is also possible to transmit a control signal between the IRD 12 and the storage device 13B through radio communication using infrared rays or through wired communication using a cable, and confirm the connecting relation and the down-load operation.

Figure 5D:
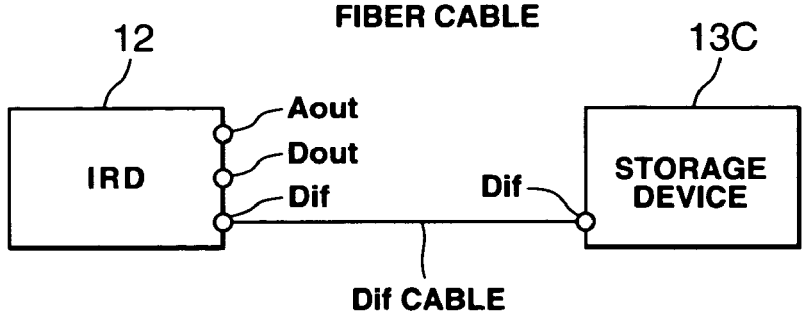

In the case where the storage device 13C having a digital interface terminal Dif conformable to the IEEE1394 standard is used as the storage device as shown in FIG. 5D, audio data that can be down-loaded is data compressed by the ATRAC system. The quadruple-speed ATRAC data of a tune designated for down-loading is sent as it is from the IRD 12 to the storage device through the digital interface cable, without being decoded. In the case of FIGS. 5B and 5C, since MPEG audio decoding processing is required, down-loading is carried out in real time. On the other hand, in the case of FIG. 5D, since the ATRAC data is not decoded and is transmitted at a quadruple speed, down-loading is completed within a time period which is ¼ of the length of the tune. That is, audio data of a four-minute tune can be down-loaded in one minute.

Thus, as the storage device 13, three types of equipments can be used, that is, the storage device for analog input, the storage device for digital audio input and the storage device for ATRAC data input.

Figure 6:
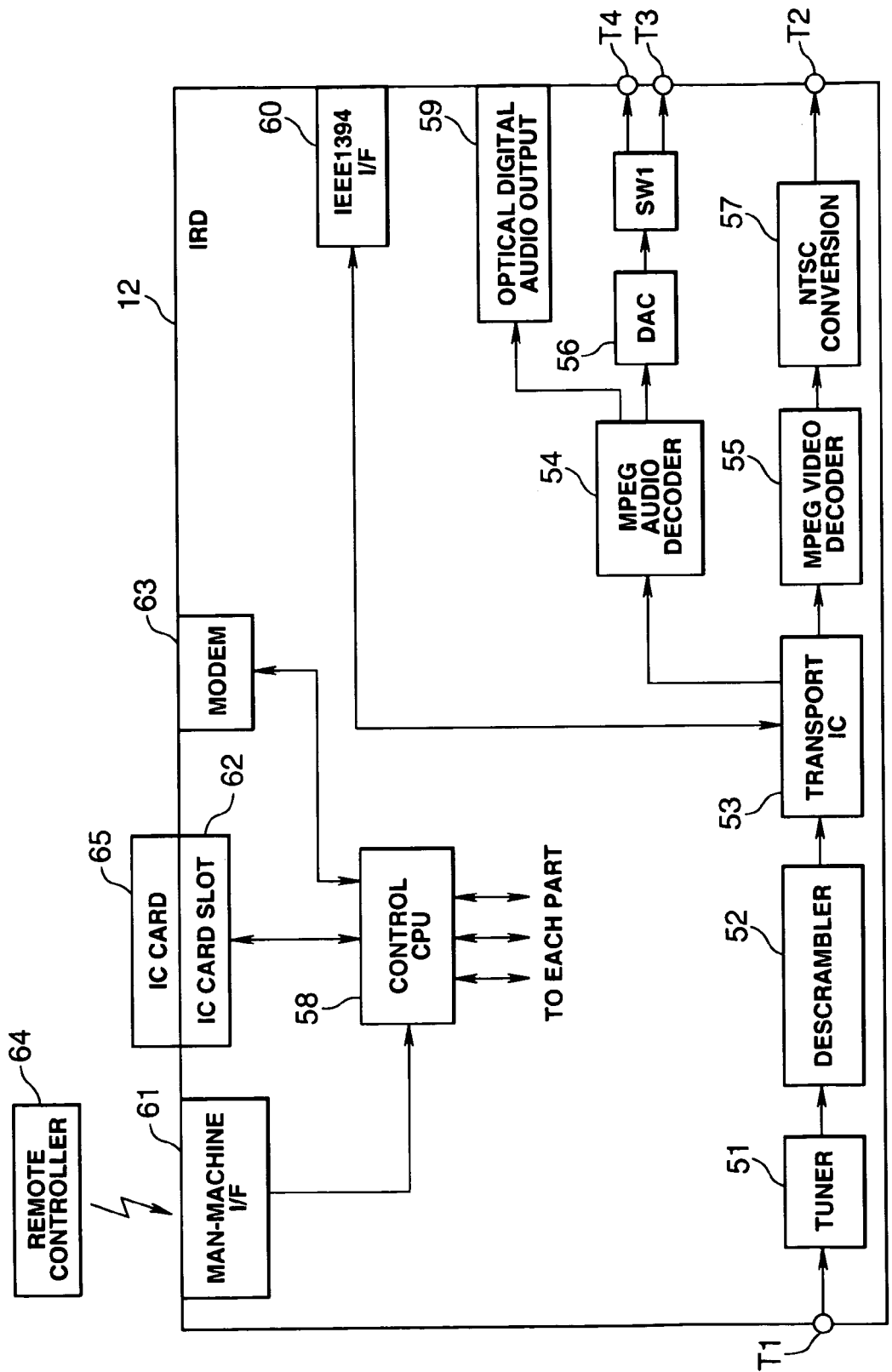
FIG. 6 is a block diagram showing an exemplary structure of the IRD in the system shown in FIG. 1.

FIG. 6 shows an exemplary structure of the IRD 12. This IRD 12 has an input terminal T1, an analog video output terminal T2, analog audio output terminals T3, T4, an optical digital audio output terminal 59, an IEEE1394 interface 60, a man-machine interface 61, an IC card slot 62, and a modem 63, as external terminals and interfaces.

The input terminal T1 is a terminal to which a received signal converted to a predetermined frequency by the LNB 15 is inputted. The analog video output terminal T2 is a terminal for supplying an analog video signal to the television receiver 14. The analog audio output terminal T3 is a terminal for supplying an analog audio signal to the television receiver 14. The analog audio output terminal T4 is equivalent to the terminal Aout of FIG. 5. The optical digital audio output terminal 59 is equivalent to the terminal Dout of FIG. 5. The IEEE1394 interface 60 is equivalent to the interface Dif of FIG. 5. The man-machine interface 61 sends an input by the viewer from the remote commander 64 to a control CPU 58. In the IC card slot 62, an IC card 65 is inserted. The modem 63 is connected to the charging server 5 through the telephone line 4.

A tuner 51 selects a signal of a predetermined receiving frequency from received signals supplied from the input terminal T1 on the basis of a setting signal from the control CPU 58, then carries out demodulation and error correction processing, and outputs an MPEG transport stream. A descrambler 52 receives the MPEG transport stream from the tuner 51 and receives descrambling key data stored on the IC card 65 through the IC card slot 62 and the control CPU 58, thus carrying out descrambling processing using the key data. A transport IC 53 receives a command inputted by the viewer from the remote commander 63 through the man-machine interface 61 and the control CPU 58, and extracts MPEG video data and MPEG audio data of a desired program from the transport stream. An MPEG video decoder 55 converts the MPEG video data supplied from the transport IC 53 to uncompressed video data. The MPEG video decoder 55 also has an OSD (on-screen display) function so that on-screen display can be realized by using this function. An NTSC conversion block 57 converts the video data supplied from the MPEG video decoder 55 to an NTSC signal and outputs the NTSC signal to the analog video output terminal T2. An MPEG audio decoder 54 converts the MPEG audio data supplied from the transport IC 53 to uncompressed audio data (PCM audio data). A D/A converter 56 converts the PCM audio data supplied from the MPEG audio decoder 54 to an analog audio signal. A switch SW1 selectively supplies the analog audio signal supplied from the D/A converter 56 to the analog audio output terminals T3, T4.

The control CPU 58 carries out control processing of the entire IRD 12. The control CPU 58 also receives through the man-machine interface 61 a command inputted by the viewer through the remote commander 64. Moreover, the control CPU 58 is connected with the modem 63. The information necessary for charging is stored on the IC card 65 as described above. The information on the IC card 65 is sent to the charging server 5 (FIG. 1) through the telephone line 4 by using the modem 63. The control CPU 58 also has an MHEG decode engine function so that the audio additional information and the GUI data shown in FIG. 4 are extracted from the transport stream. By processing these data, the screen of list page, the screen of information page of each tune, the display screen of lyrics of the tune, or EPG screen data is formed. The screen data thus formed is processed for display by using the OSD function of the MPEG video decoder 55. Thus, the screen of list page of broadcast tunes, the screen of information page of each tune, the screen of lyrics, or the EPG screen can be displayed in a designated area on the screen, as shown in FIG. 2.

The operation of the IRD 12 shown in FIG. 6 will now be described.

First, in the IRD 12 shown in FIG. 6, the viewer selects the channel of the above-described music broadcast program.

At this point, a received signal inputted to the input terminal T1 is supplied to the tuner 51. In the tuner 51, a signal of a predetermined receiving frequency is selected from the received signal on the basis of a setting signal from the control CPU 58, and demodulation and error correction processing are carried out. Thus, an MPEG transport stream is outputted.

The output of the tuner 51 is supplied to the descrambler 52. In the descrambler 52, the descrambling key data stored on the IC card 65 is inputted through the IC card slot 62 and the control CPU 58, and the MPEG transport stream is descrambled by using the key data. The descrambled MPEG transport stream is sent to the transport IC 53.

In the transport IC 53, a command inputted by the viewer from the remote commander 64 is inputted through the man-machine interface 61 and the control CPU 58. In accordance with the command, the MPEG video data and MPEG audio data (A1 in FIG. 4) of the music broadcast program are extracted from the transport stream and are sent to the MPEG video decoder 55 and the MPEG audio decoder 54, respectively. The MPEG video data sent to the MPEG video decoder 55 is converted thereby to uncompressed video data, then converted to a composite video signal by the NTSC conversion block 57, and outputted from the analog video output terminal T2 to the television receiver 14 (FIG. 1). The MPEG audio data sent to the MPEG audio decoder 54 is converted to uncompressed audio data, then converted to an analog audio signal by the D/A converter 56, and outputted from the analog audio output terminal T3 to the television receiver 14.

If, at this point, a predetermined operation is carried out by using the remote commander 64, for example, if the "interactive program" button (not shown) provided on the remote commander 64 is pressed, the transport IC 53 extracts a transport stream including GUI data and audio additional information and supplies the extracted GUI data to the control CPU 58. The control CPU 58 forms screen data from the GUI data supplied thereto, by using the MHEG decode engine function. The screen data thus formed is processed for display by using the OSD function of the MPEG video decoder 55, and is outputted from the analog audio output terminal T3 to the television receiver 14. In this manner, the screen as shown in FIG. 2 is displayed on the television receiver 14.

If the lyrics button 22 on the screen displayed on the television receiver 14 is pressed, a transport stream including audio additional information is extracted by the transport IC 53, and the extracted audio additional information is supplied to the control CPU 58. The control CPU 58 extracts lyrics data from the audio additional information supplied thereto and forms lyrics display screen data. The lyrics display screen data thus formed is processed for display by using the OSD function of the MPEG video decoder 55 and is outputted from the analog audio output terminal T3 to the television receiver 14. Thus, when the sound of the tune is outputted from the speaker of the television receiver 14, the lyrics are displayed in the text display area 21C on the screen synchronously with the sound.

If a tune is selected from the tune list 21B on the screen shown in FIG. 2 while the viewer intends to listen to the audio data of the tune on trial, the audio data of the selected tune is extracted by the transport IC 53. Although the MPEG audio data obtained by compressing sounds corresponding to images of the music broadcast program is extracted by the transport IC 53 up to this point, the MPEG audio data of the selected tune is extracted instead. The MPEG audio data of the tune, thus extracted by the transport IC 53, is decoded by the MPEG audio decoder 54, then digital/analog-converted by the D/A converter 56, then passed through the switch SW1, and outputted from the analog audio output terminal T3 to the television receiver 14. Thus, trial listening of the audio data is made possible.

In down-loading audio data of a tune by pressing the down-load button 28 on the screen shown in FIG. 2, the audio data is extracted from the transport IC 53 and the audio data is outputted from any one of the analog audio output terminal T4, the optical digital audio output terminal 59 and the IEEE1394 interface 60.

Specifically, in the case where the storage device is connected to the analog audio output terminal T4 (that is, in the case of FIG. 5B), the MPEG audio data is extracted by the transport IC 53, then decoded by the MPEG audio decoder 54, then converted to an analog signal by the D/A converter 56, and transmitted to the storage device through the analog cable.

In the case where the storage device is connected to the optical digital audio output terminal 59 (that is, in the case of FIG. 5C), the MPEG audio data is extracted by the transport IC 53 and then decoded by the MPEG audio decoder 54. After that, a PCM audio signal is transmitted to the storage device through the optical digital audio output terminal 59.

In the case where the storage device is connected to the IEEE1394 interface 60 (that is, in the case of FIG. 5D), the quadruple-speed ATRAC data is extracted by the transport IC 53, and the extracted quadruple-speed ATRAC data is transmitted as it is to the storage device through the IEEE1394 interface 60.

In this case, the jacket data compressed by the JPEG system is also extracted by the transport IC 53 and transmitted to the storage device through the IEEE1394 interface 60. Moreover, text data such as the lyrics and the profile of the artist are extracted by the transport IC 53 and transmitted to the storage device through the IEEE1394 interface 60.

Figure 7:
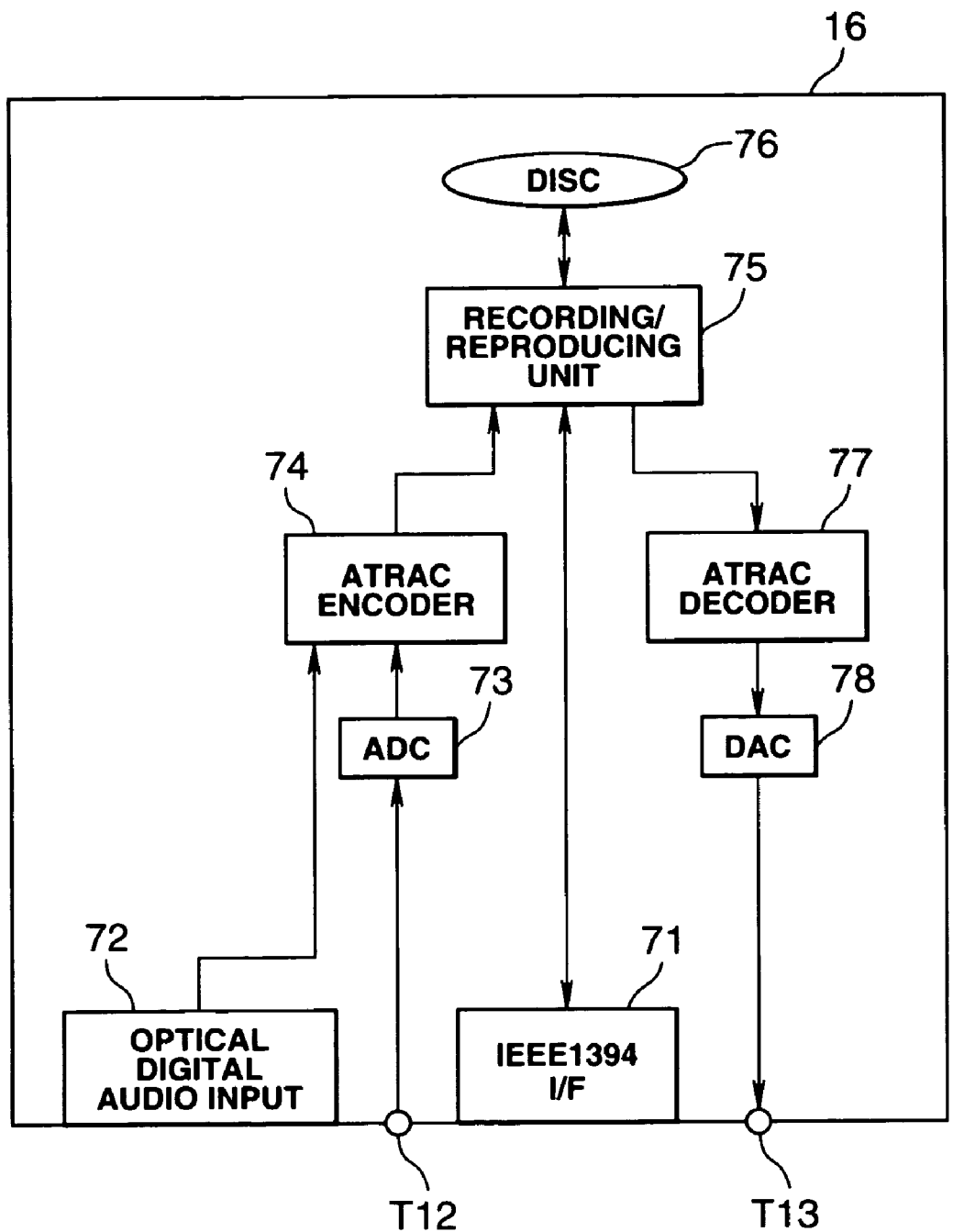
FIG. 7 is a block diagram showing an exemplary structure of a digital audio disc device having an IEEE1394 interface.

FIG. 7 is a block diagram showing an exemplary structure of a digital audio disc recorder/player 16 conformable to the IEEE1394 standard. As the digital audio disc recorder/player 16, a so-called mini disc (MD, trade name of Sony Corporation) recorder/player can be used. The digital audio disc recorder/player 16 has an IEEE1394 interface 71, an optical digital audio input terminal 72, an analog audio input terminal T12, and an analog audio output terminal T13. The IEEE1394 interface 71 is directly connected with a recording/reproducing unit 75. The optical digital audio input terminal 72 is connected to the recording/reproducing unit 75 through an ATRAC encoder 74. The analog audio input terminal T12 is connected to the ATRAC encoder 74 through an A/D converter 73. The analog audio output terminal T13 is connected with the recording/reproducing unit 75 through a D/A converter 78 and an ATRAC decoder 77. In the recording/reproducing unit 75, a disc 76 is set and recording/reproduction is carried out on this disc 76. Although not shown, a control CPU for controlling the entire digital audio disc player/recorder 16, and a man-machine interface are provided.

Meanwhile, the storage device 13A having only the analog audio input terminal Ain (T12) as shown in FIG. 5B does not have the optical digital audio input terminal 72 and the IEEE1394 interface 71. The storage device 13B having the digital audio input terminal Din as shown in FIG. 5C does not have the IEEE1394 interface 71.

The operation of the digital audio disc recorder/player 16 at the time of recording will now be described. In the case where the IEEE1394 interface 71 and the IEEE1394 interface 60 of the IRD 12 shown in FIG. 6 are connected with each other (that is, in the case of FIG. 5D), the audio data of the tune, the text data such as the lyrics, and the still picture data such as the jacket transmitted from the IEEE1394 interface 60 are inputted from the IEEE1394 interface 71 and are directly recorded onto the disc 76 by the recording/reproducing unit 75. In this case, as will be described later, the respective data are recorded onto the disc 76 in accordance with an extended MD format.

In the case where the digital audio disc recorder/player does not have the IEEE1394 interface 71 and has the optical digital audio input terminal 72 as shown in FIG. 5C, PCM audio data is inputted to the optical digital audio input terminal 72 from the optical digital audio output terminal 59 of the IRD 12. The inputted PCM audio data is encoded by the ATRAC encoder 74 and then recorded onto the disc 76 by the recording/reproducing unit 75.

In the case where the digital audio disc recorder/player does not have the IEEE1394 interface 71 and the optical digital audio input terminal 72 and only has the analog audio output terminal T12 as shown in FIG. 5B, an analog audio signal is inputted to the analog audio input terminal T12 from the analog audio output terminal T4 of the IRD 12. The inputted analog audio signal is analog/digital-converted by the A/D converter 73, then encoded by the ATRAC encoder 74, and recorded onto the disc 76 by the recording/reproducing unit 75.

That is, only in the case where the storage device 13 and the IRD 12 are connected with each other by the IEEE1394 interface as shown in FIG. 5D, the lyrics data and the still picture data of the jacket are recorded together with the audio data of the tune. On the other hand, in the case where the storage device 13 and the IRD 12 are connected with each other only at the optical digital audio input/output terminals or at the analog audio input/output terminals, only the audio data is recorded.

At the time of reproduction, the compressed audio data is decoded by the ATRAC decoder 77 and then digital/analog-converted by the D/A converter 78. Thus, an analog audio signal is outputted from the analog audio output terminal T13. The lyrics data and jacket data reproduced from the disc 76 are supplied from the IEEE1394 interface 71 to the IEEE1394 interface 60 of the IRD 12, the processed for display by the CPU 58 and the MPEG video decoder 55 in the IRD 12, and displayed on the television receiver 14. In the case where not only the television receiver 14 but also a display and a printer having an IEEE1394 interface are connected to the digital audio disc recorder/player 16, the lyrics and jacket can be displayed on the display and can be printed by the printer.

Thus, in the digital audio disc recorder/player 16 having the IEEE1394 interface to which the present invention is applied, for example, in the so-called mini disc (MD, trade name of Sony Corporation) recorder/player, recording/reproduction of the lyrics data and jacket data together with the audio data of the tune is made possible.

Figure 8:
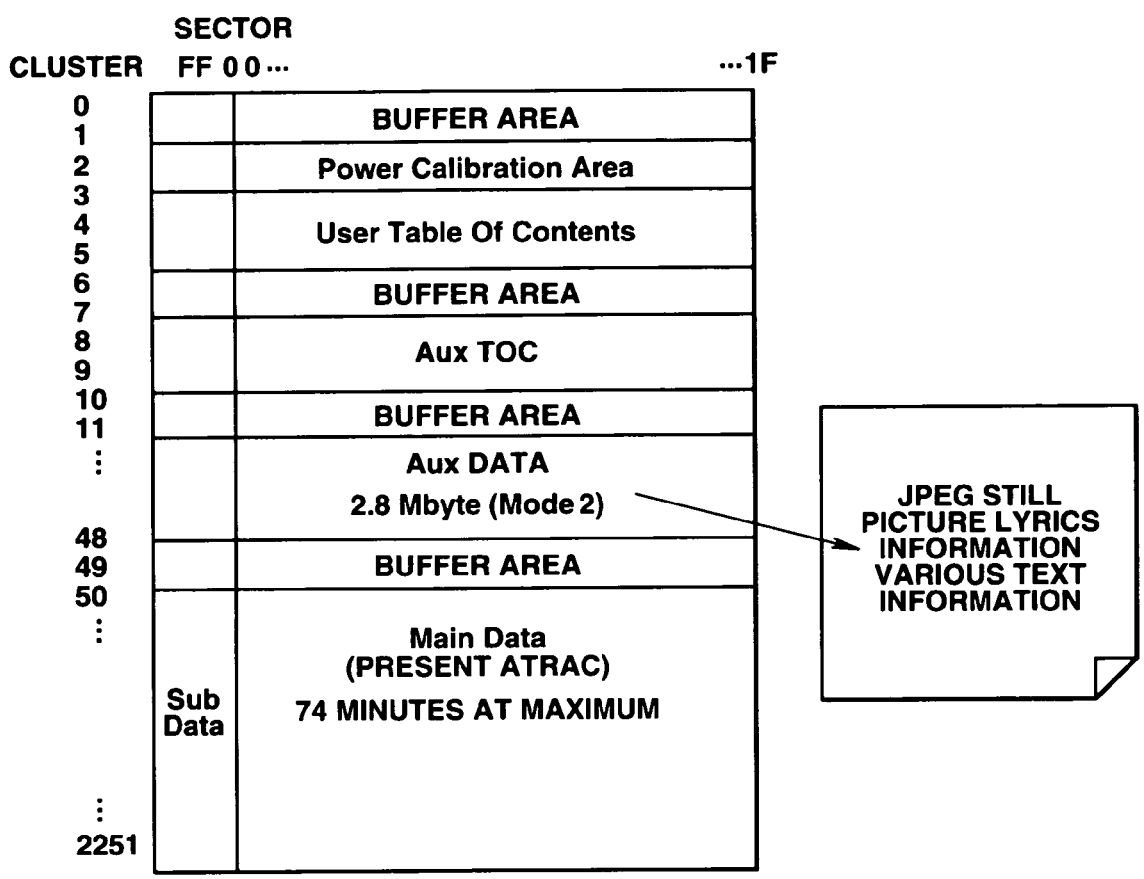
FIG. 8 shows the recording format of a digital audio disc.

This recording/reproduction is made possible by using an extended MD format as shown in FIG. 8. As shown in FIG. 8, the audio data of the tune is recorded in a main data area in accordance with the ATRAC system. This is the same as the existing MD format. In the extended MD format, the above-described jacket data, lyrics data and the like are recorded in an auxiliary data (Aux Data) area of 2.8 Mbytes. By using this format, the jacket data and lyrics data can be recorded/reproduced together with the audio data of the tune. Also, the compatibility with the existing MD format can be maintained.

Figure 9:
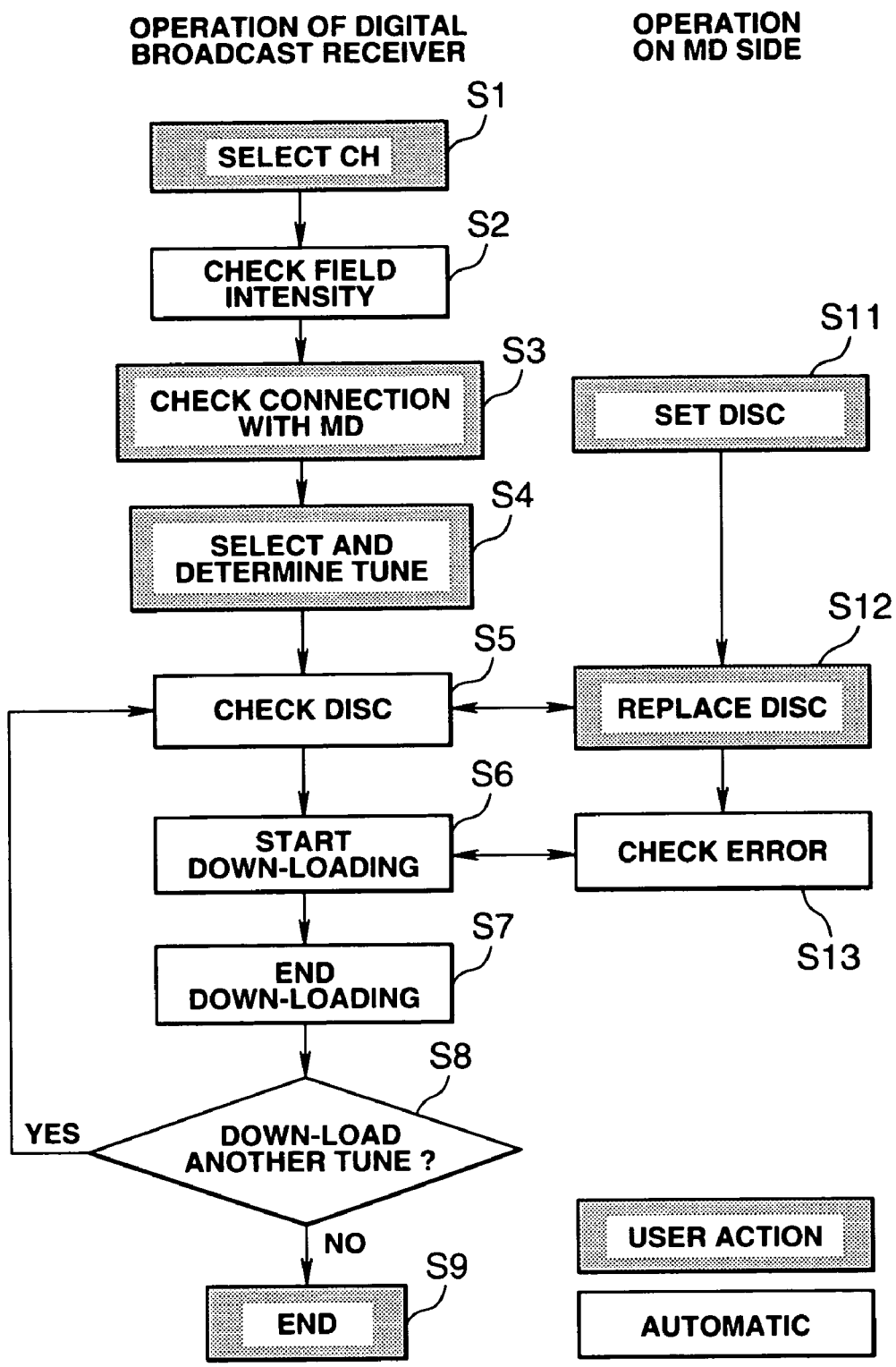
FIG. 9 is a flowchart showing the operation in down-loading audio data and audio additional information of a tune.

FIG. 9 is a flowchart showing the operation in down-loading audio data of a tune, and jacket data, lyrics data and the like as additional information in the receiver facilities shown in FIGS. 6 and 7.

First, in the IRD 12, the user selects the channel of a music broadcast program in which down-loading of tune data is made possible as described above (step S1). Specifically, the user gives a channel selection command by using the remote commander 64 of FIG. 6 while watching the EPG displayed on the television receiver 14. In the IRD 12, the control CPU 58 receives the user selection command from the user through the man-machine interface 61 and sends a channel setting signal to the tuner 51, thus setting a desired channel.

Next, the control CPU 58 checks the field intensity by using the output of the tuner 51 (step S2). If the field intensity is at a predetermined level or lower, the reliability of received data is low and therefore the subsequent processing is halted.

After commanding the setting of the receiving channel of the IRD 12 at step S1, the user sets a disc onto the digital audio disc recorder/player 16, for example, the so-called MD recorder/player, at step S11. In addition, the user checks whether the IRD 12 and the MD recorder/player are connected with each other by the IEEE1394 interface (step S3), and then selects a tune and gives a command to determine down-loading of the tune (step S4). At this point, information for identifying the selected tune is stored in a register (not shown) in the control CPU 58.

When the down-load command is given, the control CPU 58 of the IRD 12 checks the disc set on the MD recorder/player (digital audio disc recorder/player 16) through the IEEE1394 interface (step S5). Specifically, the control CPU 58 issues commands as to whether the disc 76 is set in the recording/reproducing unit 75 and whether the disc has a sufficient recording capacity, and monitors the response to these commands. If the disc has an insufficient recording capacity, the user replaces the disc (step S12).

The disc is checked at step S5, and if the result is OK, down-loading is started (step S6). Specifically, as described already, quadruple-speed ATRAC data, JPEG still picture data of the jacket or the like, and text data of the lyrics or the like are extracted by the transport IC 53 and transmitted to the MD recorder/player through the IEEE1394 interface 60. These data are inputted from the IEEE1394 interface 71 and directly recorded onto the disc 76 by the recording/reproducing unit 75.

In the MD recorder/player, it is checked whether there is an error or not (step S13). Specifically, though the error correction code is added to the data transmitted from the IRD 12 to the MD recorder/player by the IEEE1394 interface 60 in the IRD 12, correct data cannot be recorded onto the disc 76 if error correction cannot be carried out by the IEEE1394 interface 71 in the MD recorder/player. Thus, in the MD recorder/player, an error in the data transmitted from the IRD 12 is monitored, and re-transmission of data for down-loading is requested to the IRD 12 if error correction cannot be carried out.

On completion of transmission of down-load data (step S7) while error check is thus carried out, it is discriminated whether or not another tune is to be down-loaded (step S8). Whether transmission of down-load data is completed or not is discriminated by the control CPU 58 monitoring whether or not all the ATRAC data, text data and JPEG data of the channel number selected at step S4 have been extracted. If it is discriminated that transmission of down-load data is completed, the information stored in the register at step S4 is deleted. Whether another tune is to be down-loaded or not is discriminated by monitoring whether or not all the down-load data of the tune selected at step S4 have been transmitted to the MD recorder/player.

On completion of transmission of the down-load data of all the selected tunes, down-load processing ends (step S9).

The processing in the case where down-loading is carried out simultaneously with selection of the tune is described above. In the system to which the present invention is applied, as described already, reservation of down-loading can be made. In such a case, the processing of step S2 is carried out at a reserved time, and then the processing of step S6 and subsequent steps is carried out. The processing of step S1 and steps S3 to S5 is carried out at the time of reservation setting.

Figure 10:
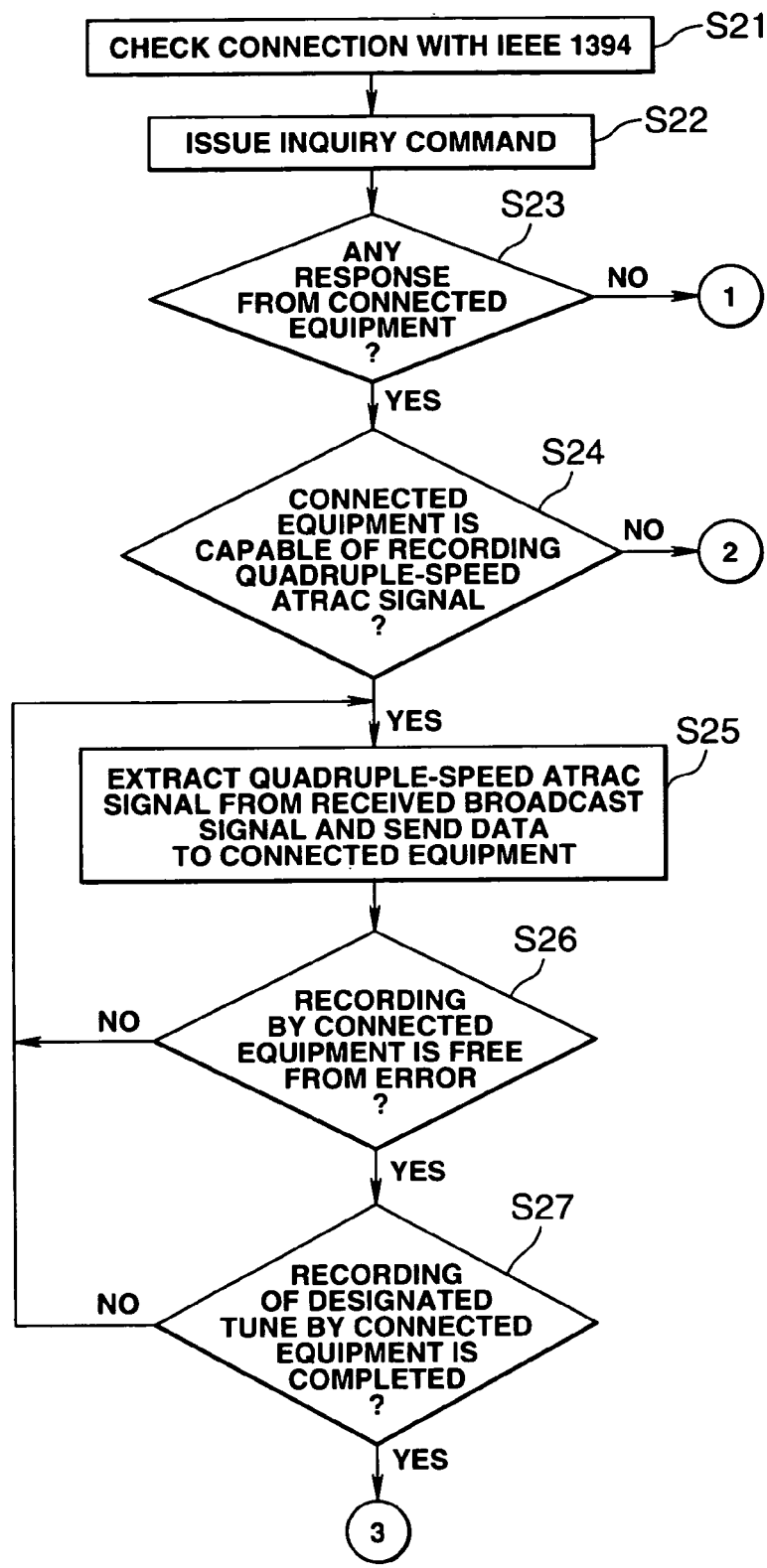
FIG. 10 is a flowchart showing a part of processing in which the IRD in the system shown in FIG. 1 selects and down-loads output data corresponding to a connected storage device after checking the relation of connection between an output terminal of the IRD itself and the storage device.
Figure 11:
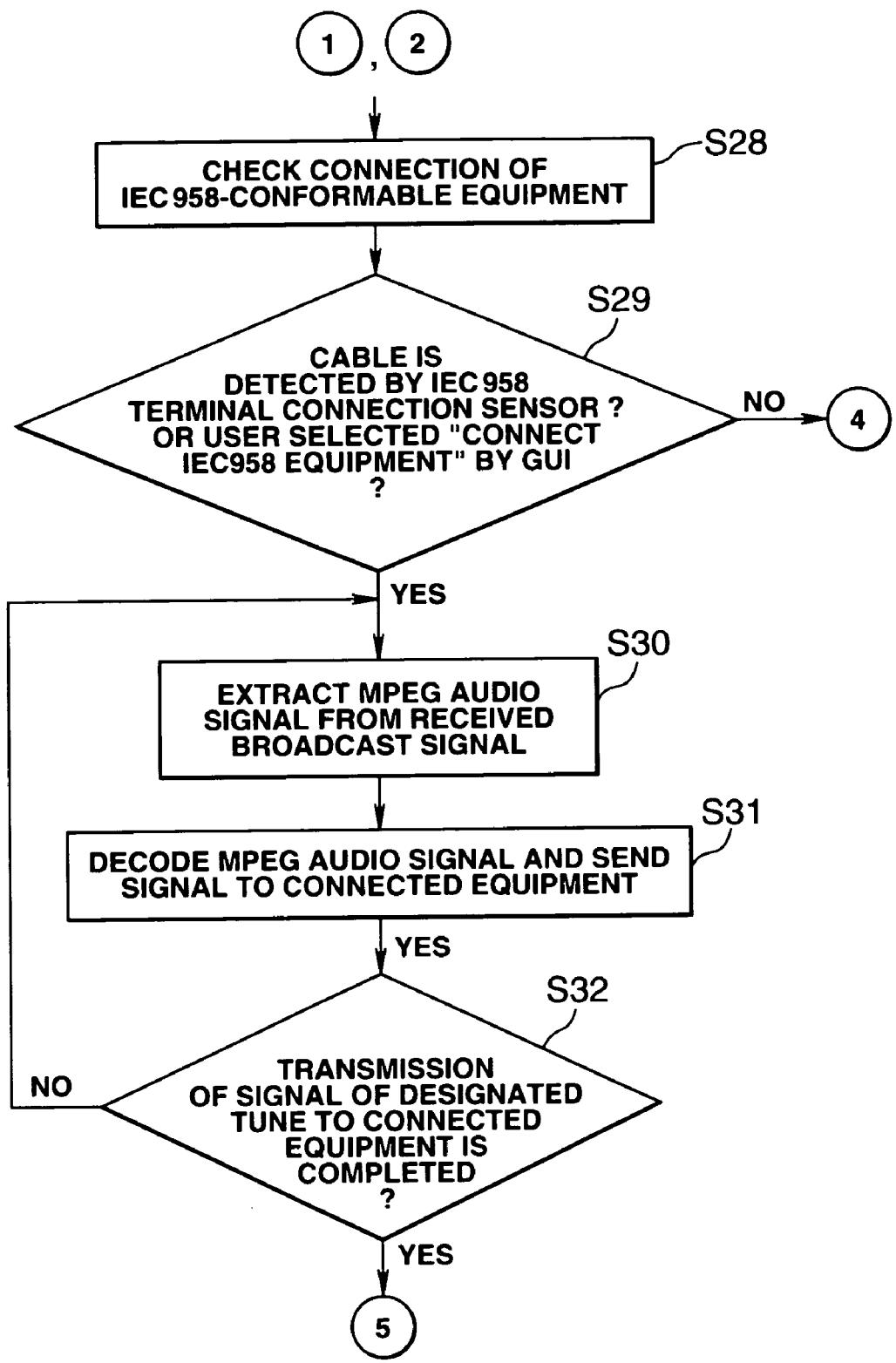
FIG. 11 is a flowchart showing another part of the processing in which the IRD in the system shown in FIG. 1 selects and down-loads output data corresponding to a connected storage device after checking the relation of connection between an output terminal of the IRD itself and the storage device.
Figure 12:
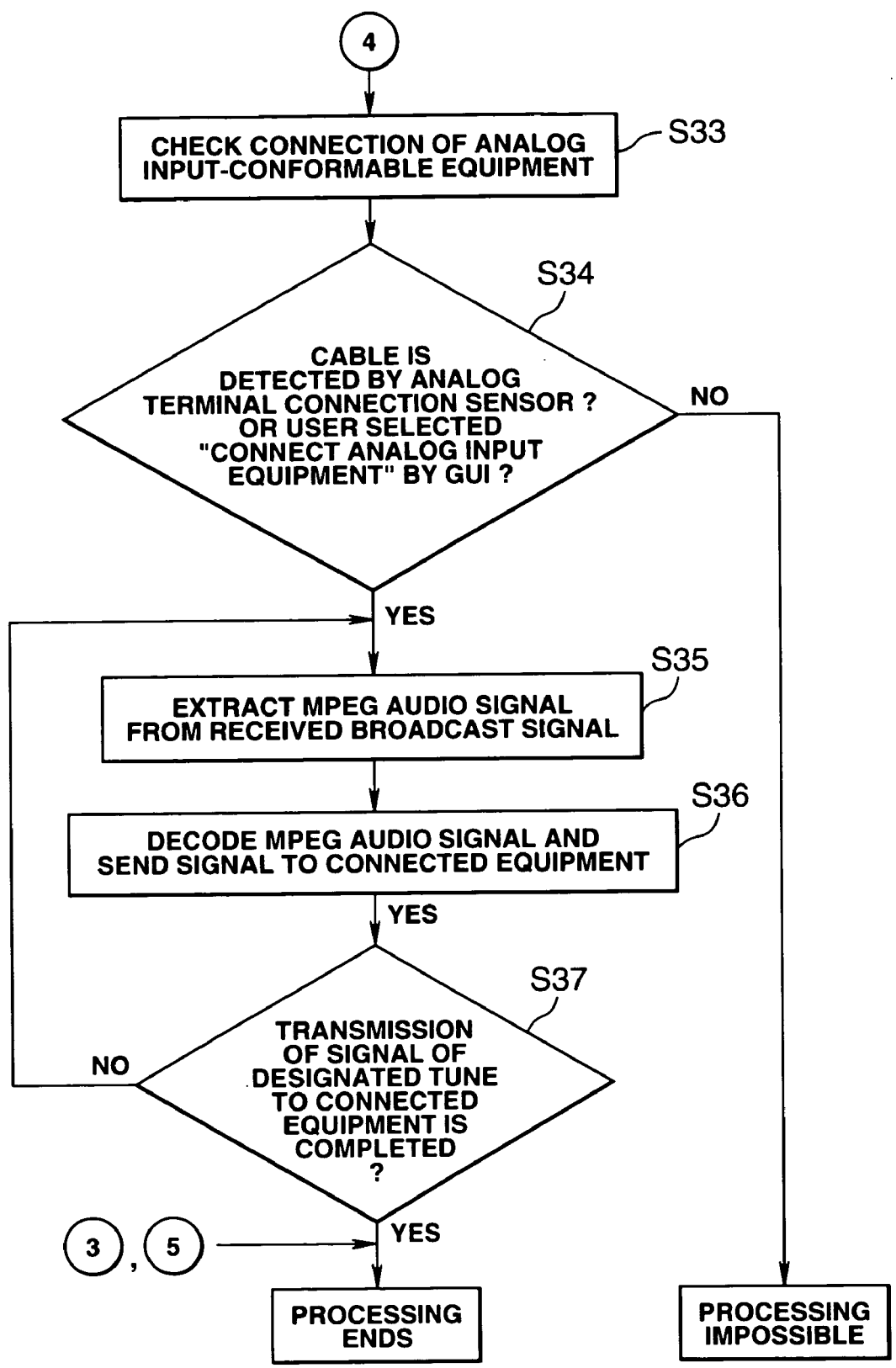
FIG. 12 is a flowchart showing still another part of the processing in which the IRD in the system shown in FIG. 1 selects and down-loads output data corresponding to a connected storage device after checking the relation of connection between an output terminal of the IRD itself and the storage device.

The processing carried out by the control CPU 58 at the time of discrimination of a connection equipment and selection of selection will now be described with reference to the flowcharts of FIGS. 10 to 12. In this case, connection is checked in the order of the IEEE1394 interface 60, the digital audio output terminal 59 (IEC958), and the analog audio output terminal T4.

First, processing for checking whether or not an equipment is connected to the IEEE1394 interface 60 is started (step S21). If an IEEE1394-conformable equipment is connected to the IEEE1394 interface 60 through an IEEE1394 cable, bidirectional communication with the equipment connected thereto is possible, and therefore an INQUIRY command is transmitted (step S22). This command is a command inquiring the function or the like of the equipment connected to the IEEE1394 interface 60 (hereinafter referred to as the connected equipment).

If response from the connected equipment is sent back (YES at step S23), whether or not the connected equipment is capable of recording quadruple-speed ATRAC data is discriminated from the contents of the response (step S24). If the connected equipment is capable of recording quadruple-speed ATRAC data (YES at step S24), the quadruple-speed ATRAC data is extracted by the transport IC 53 and is sent to the connected equipment through the IEEE1394 interface 60 (step S25).

Next, it is discriminated whether or not the recording by the connected equipment is free from errors. Since bidirectional communication is possible between the IEEE1394 interface 60 and the connected equipment as described above, the connected equipment can transmit response as to whether recording could be normally carried out or not, to the IRD 12. The control CPU 58 in the IRD 12 monitors this response and discriminates whether or not the recording is free from errors (step S26).

If the recording is free from errors, it is discriminated whether the recording of the designated tune by the connected equipment is completed or not. That is, it is discriminated whether or not the tune has been recorded up to its end. In the case where the user designated down-loading of a plurality of tunes, it is simultaneously discriminated whether the down-loading of all the tunes is completed or not. Since the control CPU 58 holds the information of the tunes to be down-loaded by the viewer using the remote commander 64 while watching the GUI screen of the television receiver 14, the control CPU 58 discriminates whether all the tunes have been down-loaded or not (step S27). If the recording of all the designated tunes is completed (YES at step S27), the processing ends.

If the result is NO at step S26 or S27, the processing returns to step S25. If the result is NO at step S23 or S24, the processing shifts to checking of whether or not an equipment is connected to the optical digital audio output terminal 59. This processing will now be described.

Figure 13:
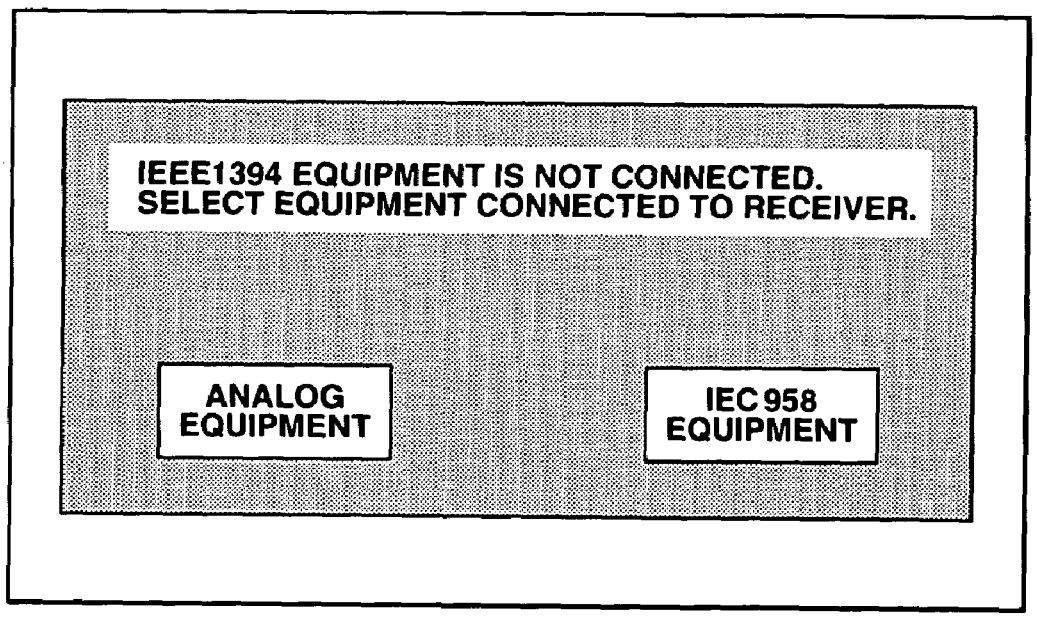
FIG. 13 shows an exemplary image displayed on a GUI screen in the processing shown in FIGS. 11 and 12.

First, the processing for checking whether or not an equipment is connected to the optical digital audio output terminal 59 is started (step S28). In the case where the optical digital audio output terminal 59 of the IRD 12 is equipped with a physical cable sensor, the control CPU 58 monitors the output of the sensor. If no sensor is provided, the viewer discriminates whether an "IEC958 equipment" is selected or not by using the remote commander 64 (step S29) while watching the GUI screen as shown in FIG. 13. If the result is YES at step S29, the MPEG audio data is extracted by the transport IC 53 (step S30). The extracted MPEG data is decoded by the MPEG audio decoder 54 and then a PCM audio signal is sent through the optical digital audio output terminal 59 to the equipment connected thereto (hereinafter referred to as the connected equipment) (step S31). After the processing of step S30 to S31 is repeated until transmission of the audio data of all the tunes designated by the viewer is completed (YES at step S32), the processing ends. If the result is NO at step S29, the processing shifts to checking of whether or not an equipment is connected to the analog audio output terminal T4. This processing will now be described.

First, the processing for checking whether or not an equipment is connected to the analog audio output terminal T4 is started (step S33). At this point, similar to step S29, in the case where the analog audio output terminal T4 of the IRD 12 is equipped with a physical cable sensor, the control CPU 58 monitors the output of the sensor. If no sensor is provided, the viewer discriminates whether an "analog input equipment" is selected or not by using the remote commander 64 (step S34) while watching the GUI screen as shown in FIG. 13. If the result is YES at step S34, the MPEG audio data is extracted by the transport IC 53 (step S35). The extracted MPEG data is decoded by the MPEG audio decoder 54, then converted to an analog audio signal by the D/A converter 56, and then sent through the analog audio output terminal T4 to the equipment connected thereto (hereinafter referred to as the connected equipment) (step S36). After the processing of step S35 to S36 is repeated until transmission of all the tunes designated by the viewer is completed (YES at step S37), the processing ends. If the result is NO at step S34, it is discriminated that no storage device is connected to the output terminal of the IRD 12 and therefore the processing is impossible.

Figure 14:
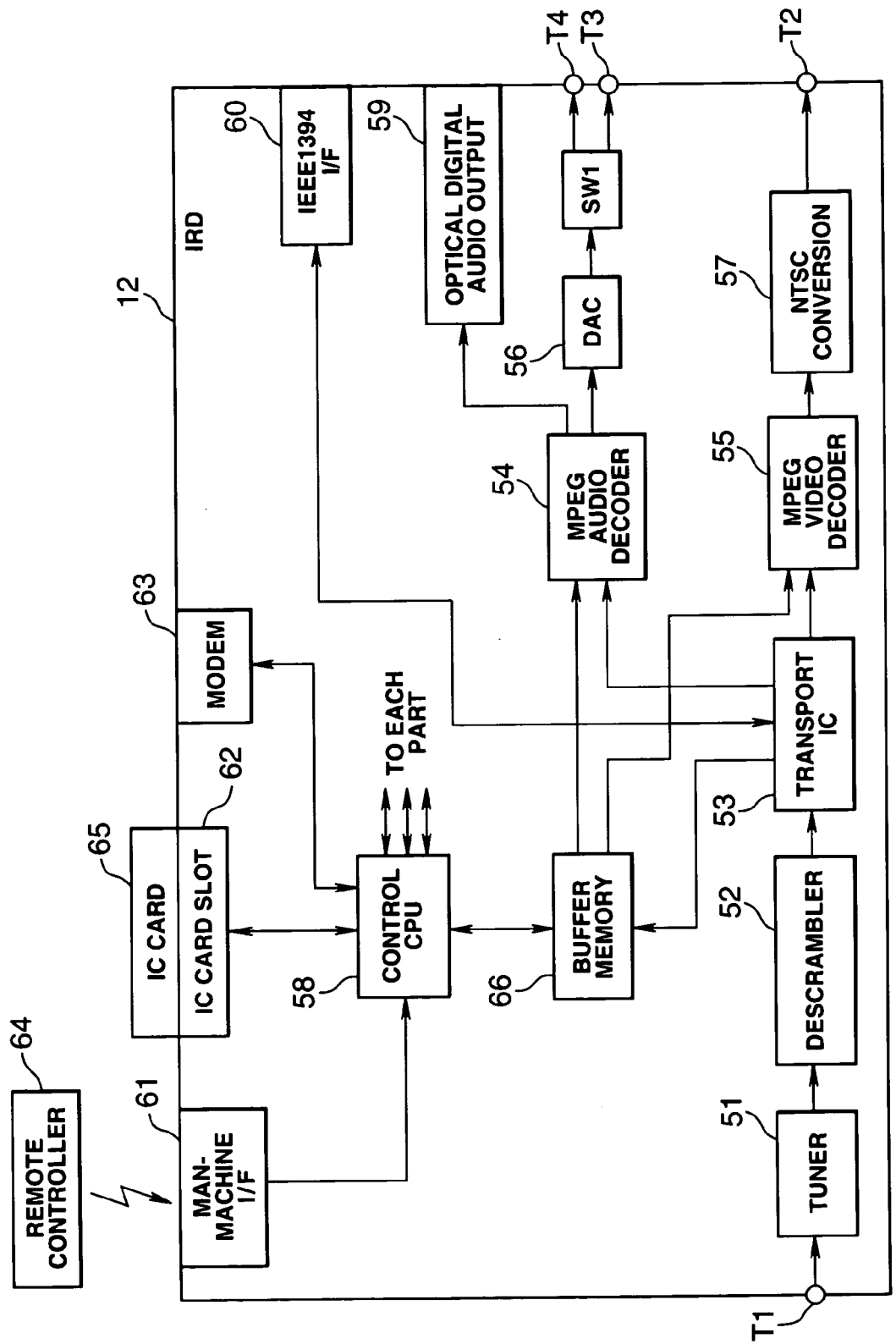
FIG. 14 is a block diagram showing the structure of an IRD in a second embodiment.

In this manner, the IRD 12 transmits quadruple-speed ATRAC data, digital audio data, or an analog audio signal in accordance with the type of the storage device connected to the IRD 12 itself A second embodiment of the IRD 12 will now be described with reference to FIG. 14. The structure of FIG. 14 differs from that of FIG. 6 in that a buffer memory 66 is provided. The buffer memory 66 is constituted by a RAM, for example, and temporarily stores audio data and lyrics data of the tune supplied from the transport IC. The audio data and lyrics data are read out at the time of trial listening and are supplied to the MPEG audio decoder 54 and the MPEG video decoder 55, respectively. The MPEG video decoder 55 converts the MPEG video data supplied from the transport IC 53 to uncompressed video data. The lyrics data supplied from the buffer memory 66 is converted to images by utilizing the OSD function of the MPEG video decoder 55. The MPEG audio decoder 54 converts the MPEG audio data supplied from the buffer memory 66 to uncompressed audio data (PCM audio data).

Figure 15:
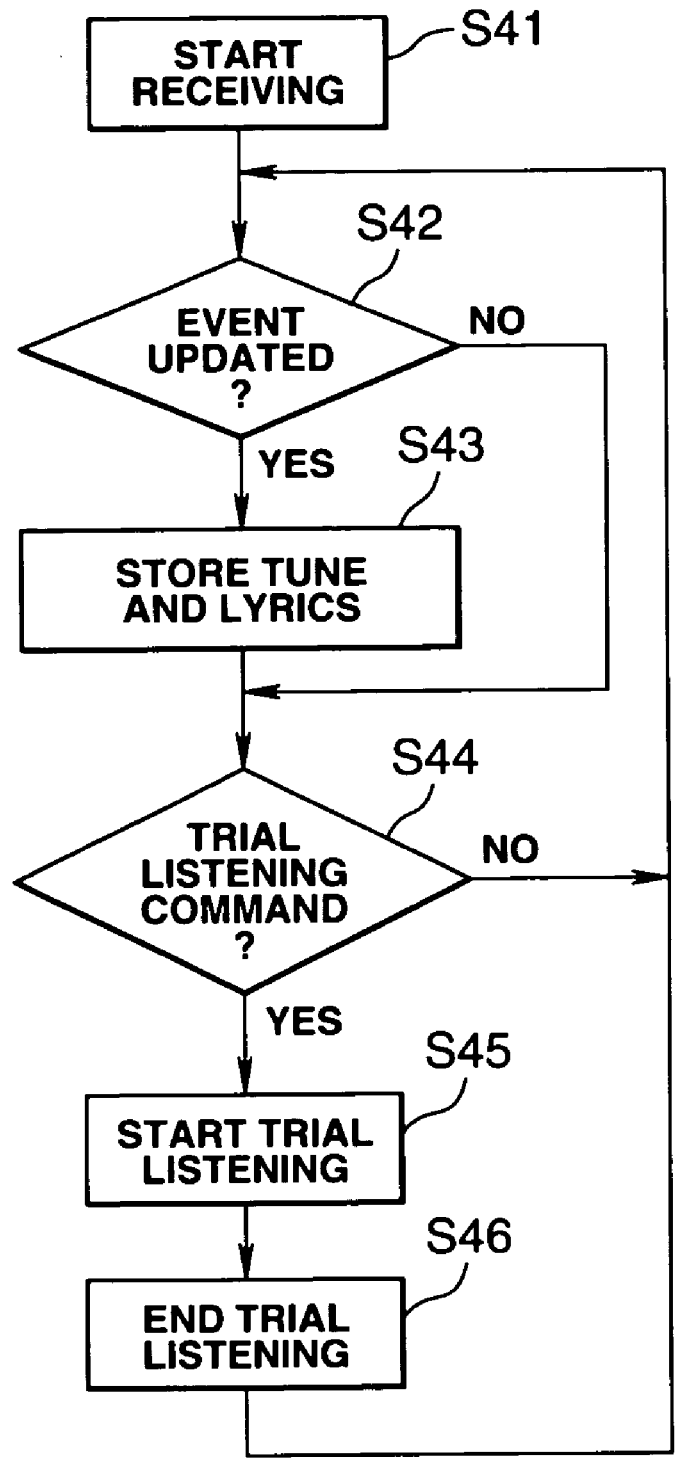
FIG. 15 is a flowchart showing processing at the time of trial listening in the IRD shown in FIG. 14.

The operation of the IRD 12 shown in FIG. 14 will now be described with reference to the flowchart of FIG. 15.

First, when the viewer selects the channel of the music broadcast program as described above in the IRD 12 shown in FIG. 14, the image as shown in FIG. 2 is displayed on the screen of the television receiver 14 (step S41).

In the case where the event is updated (YES at step S42), the MPEG audio data (1) to (10) shown in FIG. 4 are extracted from the transport stream by the transport IC 53 and stored into the buffer memory 66 (step S43). If the viewer selects the channel of the music broadcast program and starts receiving the program, the event is newly detected and therefore processing is carried out on the assumption that the event is updated. Each tune of the MPEG audio data (1) to (10) may be stored from the start to the end. However, if the capacity of the buffer memory 66 is limited, a part of the data, for example, data of the first 30 seconds may be stored. For example, in the case where 10 tunes each having a length of five minutes are repeatedly broadcast for each 30-minute event unit, the quantity of data generated by fully storing all the 10 tunes each consisting of MPEG audio data of 256 Kbps amounts to 256 [Kbps]×300 [s]×10 [tunes]=768 Mbytes, and the quantity of data generated by storing only the first 30 seconds of all the tunes amounts to 256 [Kbps]×30 [s]×10 [tunes]=76.8 Mbytes while the data quantity generated by storing the first 30 seconds of only three tunes amounts to 256 [Kbps]×30 [s]×3 [tunes]=23.04 Mbytes.

In the case where a tune is selected from the tune list 21B on the screen shown in FIG. 2 so as to carry out trial listening to the audio data of the tune (YES at step S44), the audio data of the selected tune is read out from the buffer memory 66 and decoded by the MPEG audio decoder 54. The audio data is digital/analog-converted by the D/A converter 56, then passed through the switch SW1, and outputted from the analog audio output terminal T3 to the television receiver 14. Also, the lyrics data of the tune is read out from the buffer memory 66 and supplied to the MPEG video decoder 55. The lyrics data is converted to video data by the MPEG video decoder 55 using the OSD function, then converted to a composite video signal by the NTSC conversion block 57, and outputted from the analog video output terminal T2 to the television receiver. In short, when the sound of the tune is outputted from the speaker of the television receiver 14, the lyrics are displayed in the text display area 21C of the screen synchronously with the sound (step S45).

In this case, the control CPU 58 reads out the audio data of the tune and the lyrics data stored in the buffer memory 66, from the leading part or from the most distinctive part, and supplies these data to the MPEG audio decoder 54 and the MPEG video decoder 55, respectively. The audio data and lyrics data of the tune are stored in the form of PES packet in the buffer memory 66, and time information is provided at the header. Therefore, the leading part of the tune or the leading part of the most distinctive part can be detected by viewing the time information. Even in the case where the audio data of the tune and the lyrics data are fully stored in the buffer memory 66, the viewer is allowed to listen to only a part of the tune on trial, not the entire tune.

On completion of such trial listening of tunes of a certain event (step S46), the processing returns to step S42. At step S42, it is discriminated whether the event is updated or not. If the event is not updated (NO at step S42), the presence/absence of a trial listening command is discriminated (step S44). The presence of a trial listening command at this point means that there is a trial listening command for a second tune after completion of trial listening of one tune of one event. If there is a trial listening command (YES at step S44), trial listening is started (step S45) and ended (step S46). After that, the processing returns to step S42 again. By repeating this processing, trial listening to a plurality of tunes of one event can be carried out. When the event is updated (YES at step S42), the buffer memory 66 is cleared and audio data and lyrics data of tunes of the new event are stored into the buffer memory 66.

In short, every time the event is changed, audio data of tunes distributed in that event and lyrics data of the tunes are stored into the buffer memory 66. When the viewer watches the GUI screen and selects a tune for trial listening, the audio data and lyrics data of the selected tune are read out from the buffer memory 66, and the viewer can listen to the tune from the leading part or from the most distinctive part on trial. In this trial listening, the lyrics data is displayed synchronously with the audio data of the tune.

The audio data and lyrics data of tunes for trial listening may be stored on a recording medium such as a hard disk.

A third embodiment of the IRD 12 will now be described with reference to FIG. 16. The structure of FIG. 16 differs from that of FIG. 6 in that an ATRAC decoder 54B, a D/A converter 56B and switches SW2, SW3 are provided. The transport IC 53 extracts MPEG video data, MPEG audio data and ATRAC data of a desired television program from a transport stream supplied from the descrambler 52. The ATRAC decoder 54B converts the ATRAC data supplied from the transport IC 53 to uncompressed audio data (PCM audio data). The D/A converter 56B converts the audio data supplied from the ATRAC decoder 54B to an analog audio signal. The switch SW2 selectively supplies the analog audio signal supplied from the D/A converter 56A or 56B to the analog audio output terminals T3, T4. The switch SW3 selectively supplies the audio data supplied from the MPEG audio decoder 54A or the ATRAC decoder 54B to the optical digital output interface 59.

In the case where only one MPEG audio decoder 54A is provided as the audio data decoder in the IRD 12 (that is, in the case of FIG. 6), the audio data which can be processed by this MPEG audio decoder 54A is either the audio data of the television program broadcast or the MPEG audio data (1) to (10) (FIG. 4). In short, when the viewer is watching the music broadcast program, the MPEG audio decoder 54A is occupied for processing the audio data. Therefore, trial listening to the MPEG audio data (1) to (10) cannot be carried out. On the contrary, the viewer cannot watch the television program broadcast during trial listening to one tune of the MPEG audio data (1) to (10).

A user who owns an MD recorder/player having an IEEE1394 interface can watch the music broadcast program by using the MPEG audio decoder 55 during down-loading of the ATRAC data to the mini disc 76 as described above. On the other hand, a user who owns a storage device 13A or 13B having only an optical digital audio input terminal or an analog audio input terminal cannot watch the music broadcast program during down-loading of the audio data of the tune since the MPEG audio decoder 55 is occupied for down-load processing.

Figure 16:
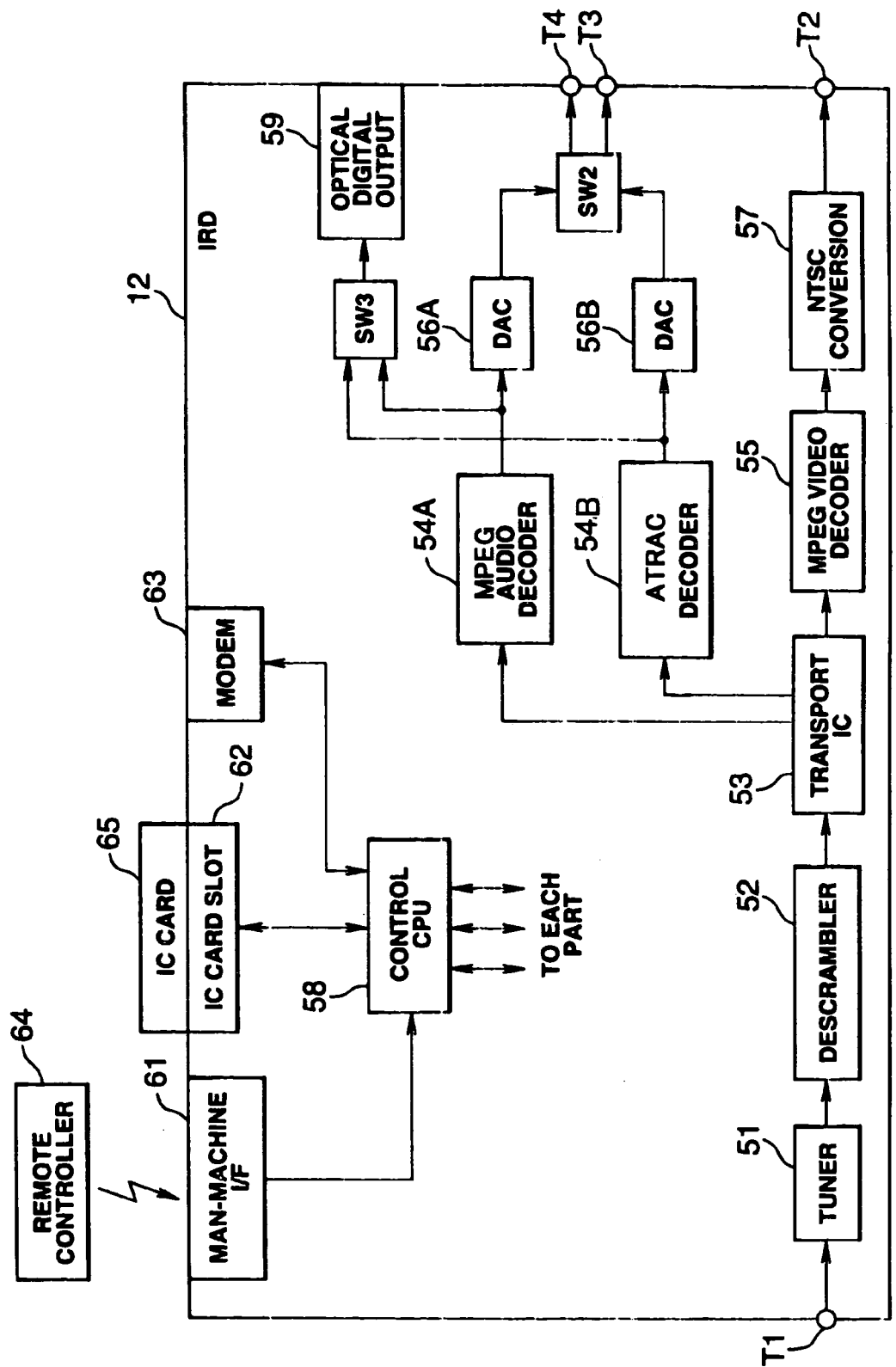
FIG. 16 is a block diagram showing the structure of an IRD in a third embodiment.

However, the IRD 12 of FIG. 16 has the ATRAC decoder 54B as well as the MPEG audio decoder 54. Therefore, even the user who owns the storage device 13A or 13B having only an optical digital audio input terminal or an analog audio input terminal can enjoy such convenience.

Specifically, the MPEG audio data and the ATRAC data are extracted by the transport IC 53 and are decoded by the MPEG audio decoder 54A and the ATRAC decoder 54B, respectively. The decoded audio data is digital/analog-converted by the D/A converters 56A and 56B and are separately outputted to the analog audio output terminals T3 and T4 through the switch SW2. For example, the television receiver 14 is connected to the analog audio output terminal T3 so that the sound of the music broadcast program can be outputted from the speaker of the television receiver 14. Alternatively, the storage device 13A or 13B is connected to the analog audio output terminal T4 or the optical digital output terminal 59 so that the tune of decoded ATRAC data can be down-loaded. Also, one tune of the MPEG audio data (1) to (10) can be decoded by the MPEG audio decoder 54A for carrying out trial listening while one tune of the ATRAC data (1) to (10) can be decoded by the ATRAC decoder 54B for carrying out trial listening.

Figure 17A:
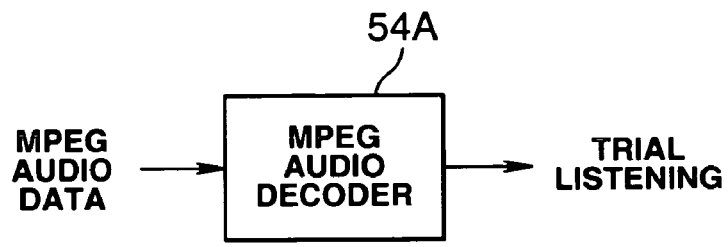
FIGS. 17A and 17B illustrate the function of the IRD shown in FIG. 16.
Figure 17A:
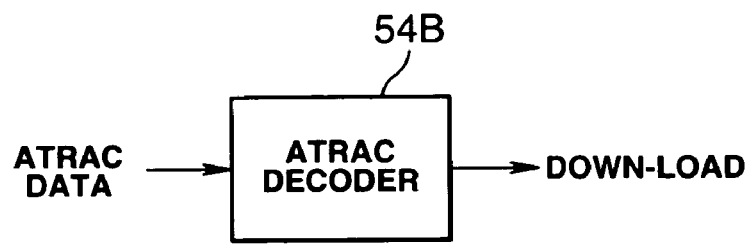
Figure 17B:
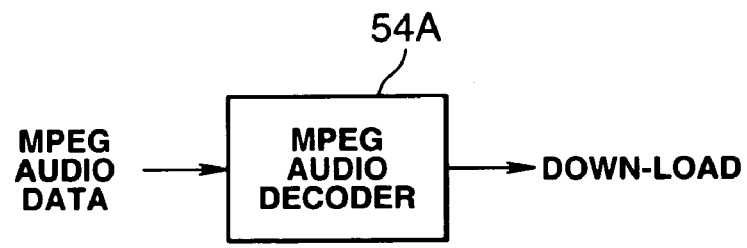
Figure 17B:
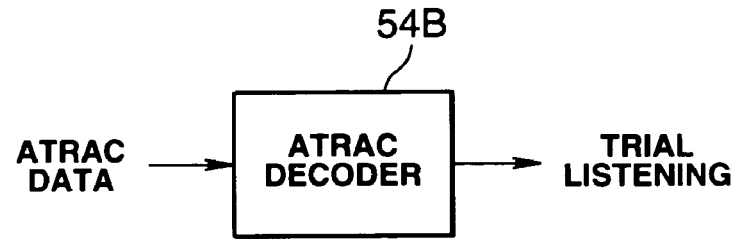

That is, in the IRD 12 shown in FIG. 16, the state where the audio data decoded by the ATRAC decoder 54B is down-loaded while trial listening to the audio data decoded by the MPEG audio decoder 54A is carried out, as shown in FIG. 17A, and the state where trial listening to the audio data decoded by the ATRAC decoder 54B is carried out while the audio data decoded by the MPEG audio decoder 54A is down-loaded, as shown in FIG. 17B, can be switched. In this case, the audio data for trial listening and the audio data for down-loading can be separately set. Since the ATRAC data is transmitted at a quadruple speed, a buffer memory (not shown) for temporarily storing the transmitted data is required.

Figure 18:
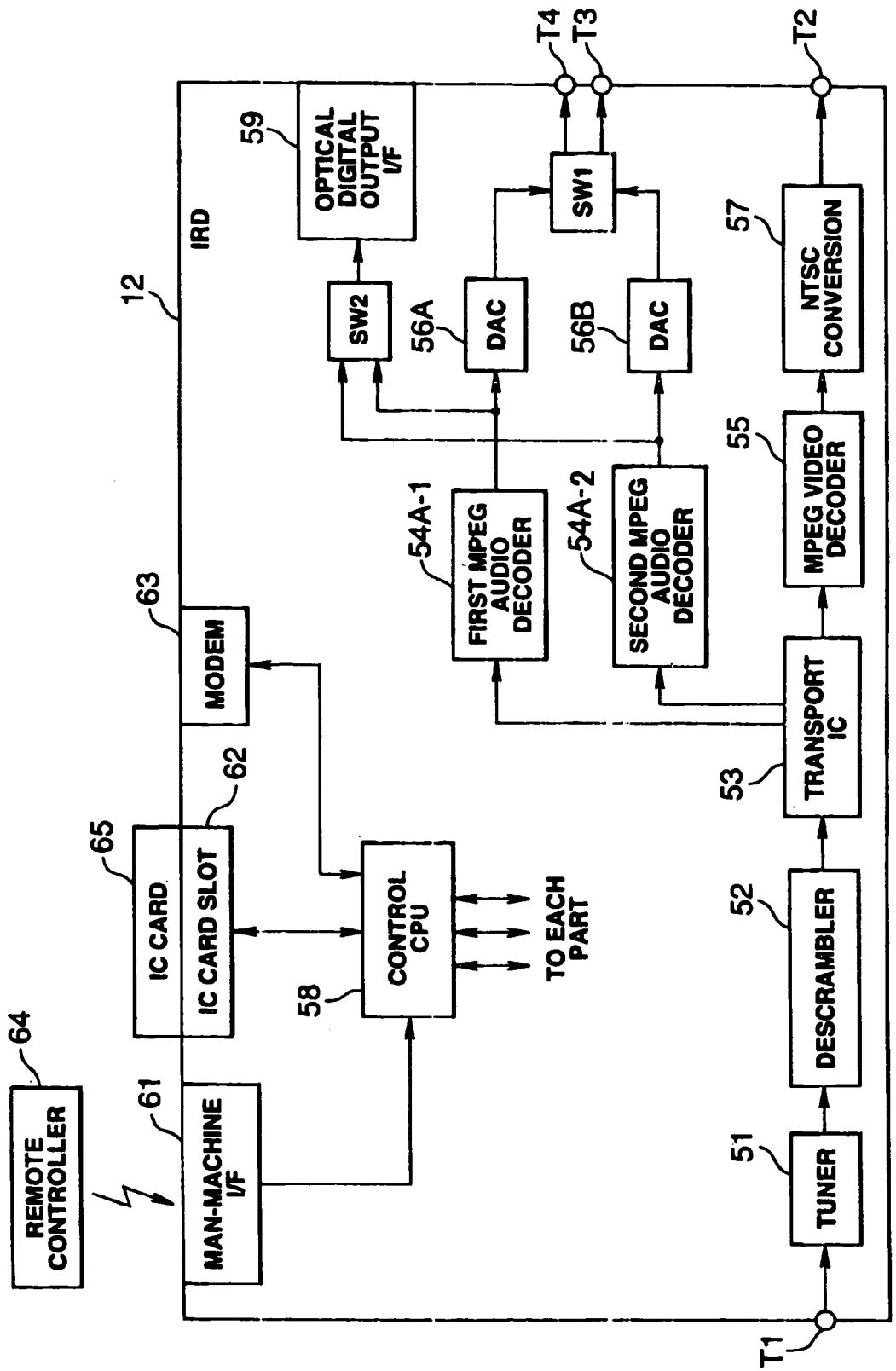
FIG. 18 is a block diagram showing the structure of an IRD in a fourth embodiment.

A fourth embodiment of the IRD 12 will now be described with reference to FIG. 18. This IRD has a second MPEG audio decoder in place of the ATRAC decoder 54B of FIG. 16. In short, this IRD has a first MPEG decoder 54A-1 and a second MPEG audio decoder 54A-2. In this IRD, too, the states similar to those of FIGS. 17A and 17B can be set.

Figure 19A:
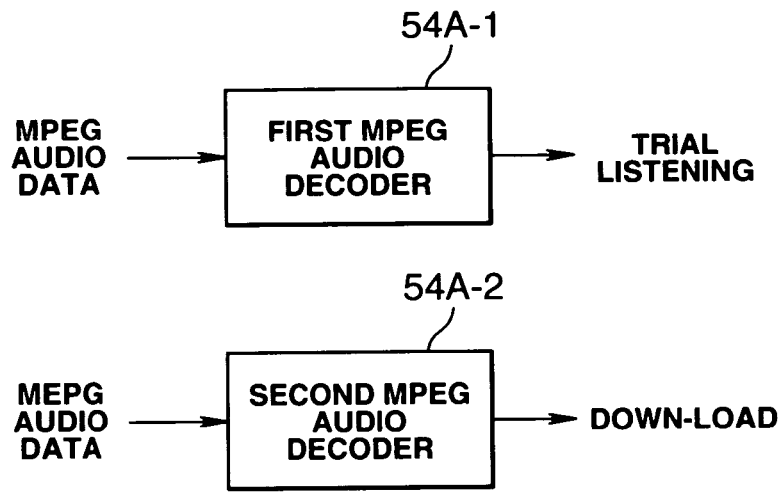
FIGS. 19A and 19B illustrate the function of the IRD shown in FIG. 18.
Figure 19B:
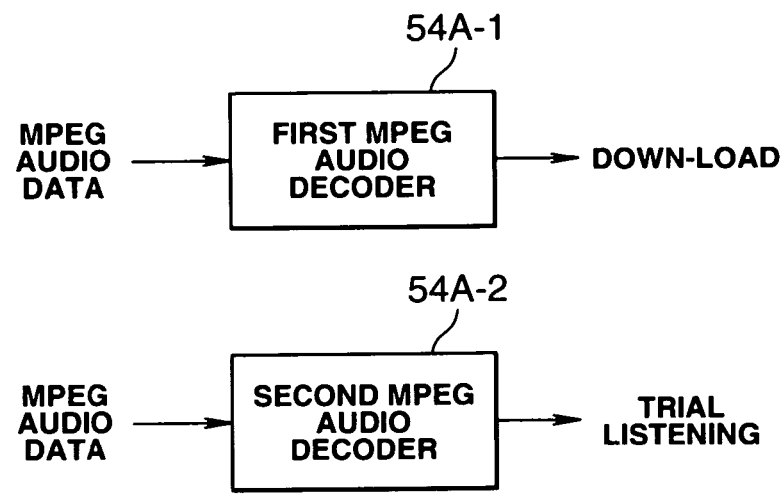

Specifically, the state where the audio data decoded by the second MPEG audio decoder 54A-2 is down-loaded while trial listening to the audio data decoded by the first MPEG audio decoder 54A-1 is carried out, as shown in FIG. 19A, and the state where trial listening to the audio data decoded by the second MPEG audio decoder 54A-2 is carried out while the audio data decoded by the first MPEG audio decoder 54A-1 is down-loaded, as shown in FIG. 19B, can be switched.

As described above, since a plurality of audio decoders are provided in the IRD 12, trial listening and down-loading of the audio data can be simultaneously carried out. The MPEG audio decoder and the ATRAC decoder in FIGS. 16 and 18 can be constituted by hardware or by software. Although not shown in FIGS. 16 and 18, the IEEE1394 interface 60 may be provided.

Figure 20:
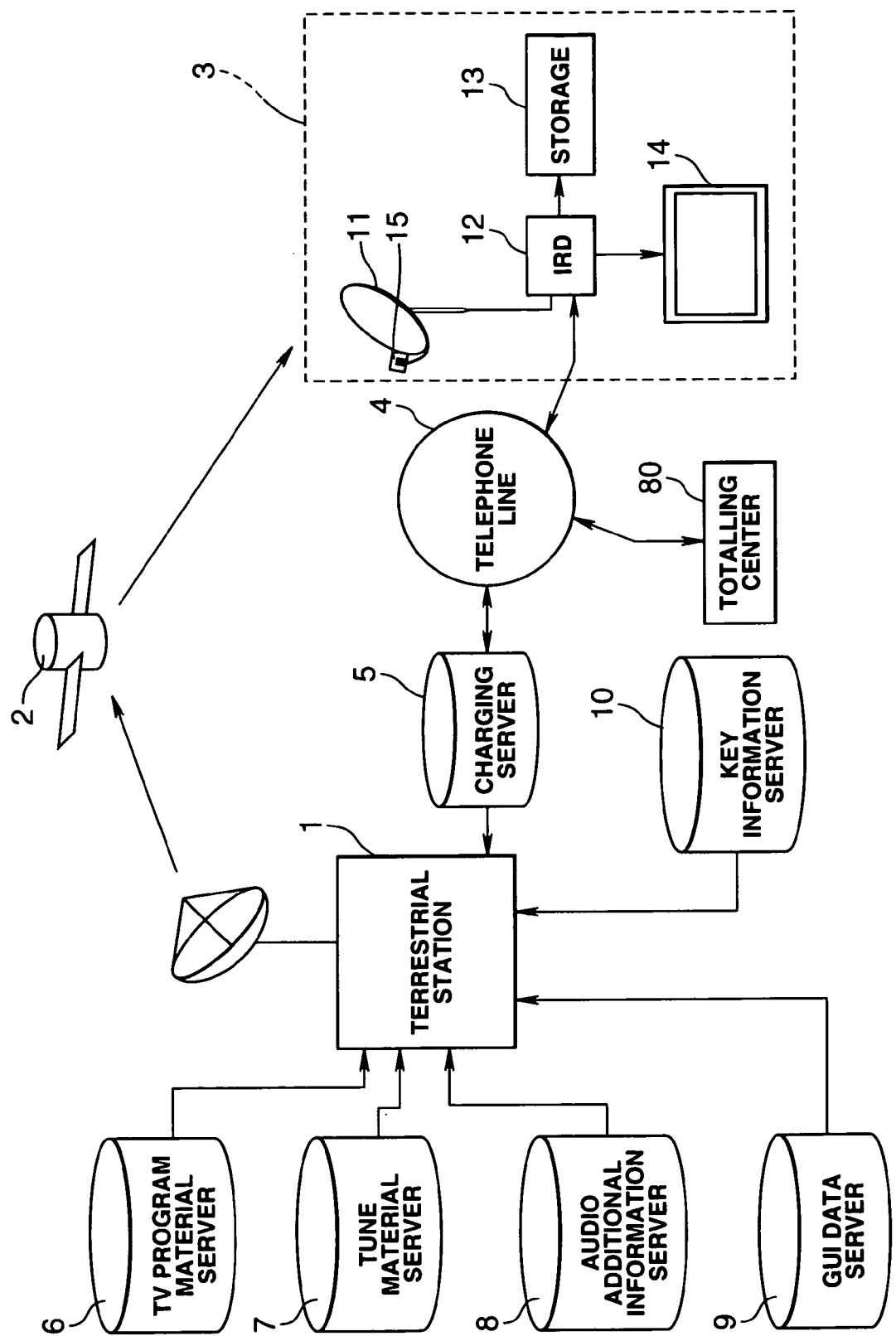
FIG. 20 is a block diagram showing the overall structure of an exemplary music contents distribution system in a fifth embodiment.

A fifth embodiment of the IRD 12 will now be described. FIG. 20 shows the overall structure of a music contents distribution system of the fifth embodiment. The IRD 12 is connected with the charging server 5 and a service use data totalling center (hereinafter referred to as totalling center) 80 through the telephone line 4.

Figure 21:
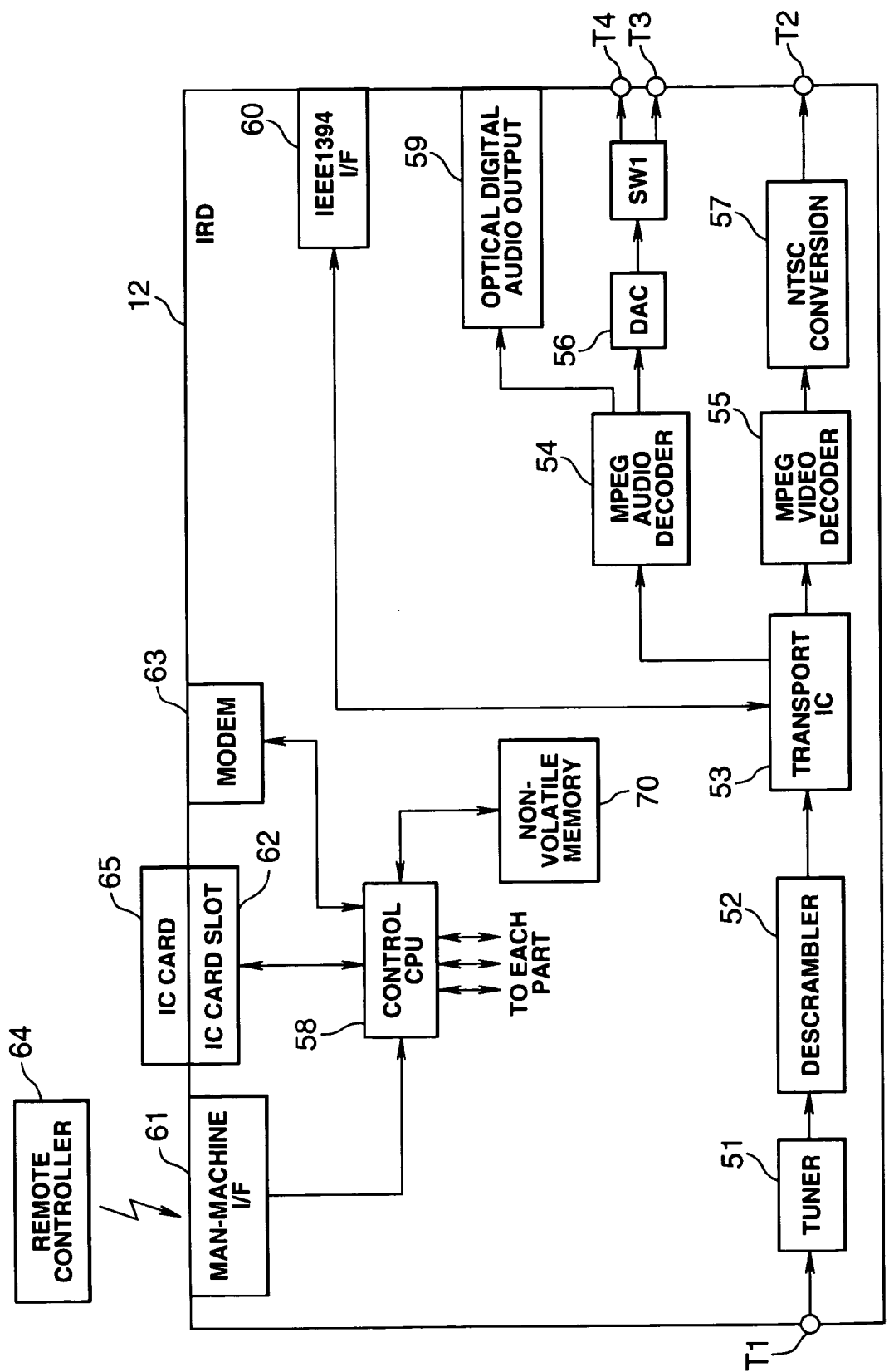
FIG. 21 is a block diagram showing the structure of an IRD in the fifth embodiment.

In the IRD 12, a non-volatile memory 70 for storing information about tunes used for trial listening and information about down-loaded tunes is provided, as shown in FIG. 21. When trial listening or down-loading of audio data of tunes is carried out, charging information is stored onto the IC card 65 and the information is also stored into the non-volatile memory 70. The information about the tunes includes the title of the down-loaded tunes or tunes used for trial listening and the date and time of down-loading or trial listening. The information stored in the non-volatile memory 70 is sent to the totalling center 80 through the telephone line 4 periodically (for example, once a week). From this information, the totalling center 80 can learn when and which tune was used for trial listening or down-loading. By processing this information, information such as frequently purchased tunes, tunes in which many customers took interest, interest of individual customers, date and time of purchase and the like can be obtained. This information can be utilized for next program forming, sales of CD and MD of the tunes, and direct marketing to individuals (preferential announcement of tickets, distribution of direct mails and the like).

The date and time when the information necessary for charging stored on the IC card 65 is sent to the charging server 5, the date and time when the information about tunes stored in the buffer memory 66 is transmitted to the totalling center 80, and the telephone number of the totalling center 80 are transmitted as EMM (entitlement management message) data in the key information of FIG. 3. On the basis of this information, the charging data and tune information are up-loaded.

The present invention can be applied not only to a system for distributing, receiving and down-loading audio data, but also to a system for distributing and down-loading still picture data, dynamic image data or software. Also, the present invention can be applied to a system for distributing data through ground wave broadcast or cable broadcast. Although a mini disc (MD, trade name of Sony Corporation) recorder/player is assumed as the storage device in the above description, the storage device is not limited to this.

As described above, according to the present invention, the type of data to be stored into a data storage device can be automatically selected in accordance with the type of the data storage device connected to the data receiving device. Also, according to the present invention, digital audio data of tunes and additional information thereof such as lyrics data and jacket data can be down-loaded.

The invention claimed is:

1. An integrated receiver decoder (IRD) device operable to receive a broadcast compressed digital signal, the IRD device comprising:
    a receiver operable to receive the broadcast compressed digital signal transmitted thereto over a transmission medium, the received compressed digital signal including audio data and picture data;
    a Motion Picture Experts Group (MPEG) audio decoder operable to decode the received compressed digital signal to provide decoded digital audio data;
    a first output terminal connectable to and disconnectable from a bi-directional data communication line in accordance with a first digital interface standard, for providing the received compressed digital signal including the audio data and the picture data to an external device through the bi-directional data communication line;
    a second output terminal connectable to and disconnectable from a one-way data communication line in accordance with a second digital interface standard different from the first digital interface standard, for providing the decoded digital audio data to the external device through the one way data communication line; and
    a controller for controlling said IRD device in accordance with a connection state between said IRD device and the external device such that either said first output terminal provides the received compressed digital signal in accordance with the first digital interface standard to the external device, or said second output terminal provides the decoded digital audio data to the external device in accordance with the second digital interface standard.

2. The IRD device of claim 1, further comprising:
    a digital-to-analog converter for converting the decoded digital audio data to an analog output signal; and
    a third output terminal for providing the analog output signal to the external device.

3. The IRD device of claim 2, wherein additional information is multiplexed with the received compressed digital signal; and wherein the additional information is provided with the received compressed digital signal to the external device when the received compressed digital signal is provided to the external device through said first output terminal, while the additional information is not provided to the external device when the decoded digital audio data is provided to the external device through said second output terminal or the analog output signal is provided to the external device through said third output terminal.

4. The IRD device of claim 1, wherein said controller carries out control so that a connection between said first output terminal and the external device is preferentially selected.

5. An IRD device as claimed in claim 1 further comprising a Motion Picture Experts Group (MPEG) video decoder operable to decode the received compressed digital signal to provide a decoded digital video signal for output to a display device.

6. An IRD device as claimed in claim 1 wherein said transmission medium is over-the-air.

7. An IRD device as claimed in claim 6 wherein said receiver includes a tuner such that said receiver is operable to receive said over-the-air broadcast compressed digital signal at a selected frequency of a plurality of broadcast frequencies.

8. An IRD device as claimed in claim 7 wherein said receiver includes a descrambler coupled to receive output of said tuner such that said receiver is operable to descramble said over-the-air broadcast compressed digital signal.

9. An IRD device as claimed in claim 1, wherein the first digital interface standard includes IEEE1394.

10. An IRD device as claimed in claim 9, wherein the second digital interface standard includes IEC958.

11. An IRD device as claimed in claim 1, wherein the second output terminal is operable to provide the decoded digital audio data to the external device by optical transmission.

12. A method for use in a device for receiving a broadcast compressed digital signal encoded according to a Motion Picture Experts Group (MPEG) algorithm, the method comprising:
    receiving the broadcast compressed digital signal transmitted thereto over a transmission medium, the received compressed digital signal including audio data and picture data;
    decoding the received compressed digital signal with an MPEG decoder to provide decoded digital audio data;
    selecting one of first and second output terminals in accordance with a connection state between the device and an external device;
    when the first output terminal is selected, providing the received compressed digital signal including the audio data and the picture data to the external device connected to the device through a bi-directional data communication line in accordance with a first digital interface standard; and
    when the second output terminal is selected, providing the decoded digital audio data to the external device connected to the device through a one way data communication line in accordance with a second digital interface standard different from the first digital interface standard.

13. The method of claim 12, wherein the selecting step selects one of first, second and third output terminals, the method further comprising:
    converting the decoded digital audio data into an analog output signal; and
    when the third output terminal is selected, providing the analog output signal to the external device.

14. The method of claim 13, wherein additional information is multiplexed with the broadcast compressed digital signal, the method further comprising:

providing the additional information together with the received compressed digital signal to the external device when the received compressed digital signal is provided to the external device through the first output terminal, wherein the additional information is not provided to the external device when the decoded digital audio data is provided to the external device through the second output terminal or the analog output signal is provided to the external device through the third output terminal.

15. The method of claim 12, wherein the selecting step preferentially selects the first output terminal.

16. An integrated receiver decoder (IRD) device operable to receive a broadcast compressed digital signal, the IRD device comprising:
  a receiver operable to receive the broadcast compressed digital signal transmitted thereto over a transmission medium, the received compressed digital signal including audio data and picture data;
  a Motion Picture Experts Group (MPEG) audio decoder operable to decode the received compressed digital signal to provide decoded digital audio data;
  a converter for converting the decoded digital audio data into an analog output signal;
  a first output terminal connectable to and disconnectable from a bi-directional data communication line in accordance with a first digital interface standard, for providing the received compressed digital signal including the audio data and the picture data to an external device through the bi-directional data communication line;
  a second output terminal connectable to and disconnectable from a one-way data communication line in accordance with a second digital interface standard different from the first digital interface standard, for providing the decoded digital audio data to the external device through a one way data communication line;
  a third output terminal for providing the analog output signal to the external device; and
  a controller for controlling said IRD device in accordance with a connection state between said IRD device and the external device such that either said first output terminal provides the received compressed digital signal to the external device in accordance with the first digital interface standard, or said second output terminal provides the decoded digital audio data to the external device in accordance with the second digital interface standard, or said third output terminal provides the analog output signal to the external device.

17. An IRD device as claimed in claim 16 further comprising a Motion Picture Experts Group (MPEG) video decoder operable to decode the received compressed digital signal to provide a decoded digital video signal for output to a display device.

18. An IRD device as claimed in claim 17 wherein said transmission medium is over-the-air.

19. An IRD device as claimed in claim 18 wherein said receiver includes a tuner such that said receiver is operable to receive said over-the-air broadcast compressed digital signal at a selected frequency of a plurality of broadcast frequencies.

20. An IRD device as claimed in claim 19 wherein said receiver includes a descrambler coupled to receive output of said tuner such that said receiver is operable to descramble said over-the-air broadcast compressed digital signal.

* * * * *